United States Patent
Inoue et al.

(10) Patent No.: US 10,811,669 B2
(45) Date of Patent: Oct. 20, 2020

(54) BATTERY AND METHOD FOR MANUFACTURING SAME

(71) Applicant: NEC Corporation, Tokyo (JP)

(72) Inventors: Kazuhiko Inoue, Tokyo (JP); Kenichi Shimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 340 days.

(21) Appl. No.: 15/550,668

(22) PCT Filed: Feb. 9, 2016

(86) PCT No.: PCT/JP2016/053756
§ 371 (c)(1),
(2) Date: Aug. 11, 2017

(87) PCT Pub. No.: WO2016/132961
PCT Pub. Date: Aug. 25, 2016

(65) Prior Publication Data
US 2018/0026256 A1 Jan. 25, 2018

(30) Foreign Application Priority Data
Feb. 17, 2015 (JP) ................. 2015-028406

(51) Int. Cl.
| | | |
|---|---|---|
| H01M 2/34 | (2006.01) | |
| H01M 10/0525 | (2010.01) | |
| H01M 10/058 | (2010.01) | |
| H01M 2/30 | (2006.01) | |
| H01M 2/10 | (2006.01) | |
| H01M 2/20 | (2006.01) | |
| H01M 10/052 | (2010.01) | |

(52) U.S. Cl.
CPC ......... *H01M 2/348* (2013.01); *H01M 2/1022* (2013.01); *H01M 2/1072* (2013.01);
(Continued)

(58) Field of Classification Search
CPC ........ H01M 2/30; H01M 2/345; H01M 2/348; H01M 2/0207; H01M 2/1061
See application file for complete search history.

(56) References Cited

U.S. PATENT DOCUMENTS

| 2004/0029001 A1 | 2/2004 | Yamazaki et al. |
| 2011/0104520 A1 | 5/2011 | Ahn |
| (Continued) | | |

FOREIGN PATENT DOCUMENTS

| JP | 2000-67846 A | 3/2000 |
| JP | 2000067846 A * | 3/2000 |
| (Continued) | | |

OTHER PUBLICATIONS

International Search Report of PCT/JP2016/053756, dated Apr. 19, 2016. [PCT/ISA/210].

*Primary Examiner* — Stephan J Essex
(74) *Attorney, Agent, or Firm* — Sughrue Mion, PLLC

(57) ABSTRACT

Provided is a battery capable of surely interrupting current at the time of temperature rise so that excessive heat generation does not occur at the occurrence of an abnormality. The battery 1 includes a battery element 10 including a positive electrode and a negative electrode, an inner package 13 which forms a first chamber 13a for enclosing the battery element 10, an outer package 14 which encloses the inner package 13 such that the outer package 14 forms a second chamber 14a which surrounds the first chamber 13a, and a pair of terminals 11, 12 electrically connected to the positive electrode and the negative electrode and led out to the outside of the outer package 14. One terminal 11 of the pair of terminals 11, 12 has a first terminal 11a and a second terminal 11b arranged so as to be electrically connected in the second chamber 13a. A gas generating material 14 which generates gas at a predetermined temperature or higher or a predetermined voltage or higher is enclosed in the first chamber 13a or the second chamber 14a.

18 Claims, 14 Drawing Sheets

(52) U.S. Cl.
CPC ............... *H01M 2/20* (2013.01); *H01M 2/30* (2013.01); *H01M 2/345* (2013.01); *H01M 10/058* (2013.01); *H01M 10/0525* (2013.01); *H01M 2/1061* (2013.01); *H01M 10/052* (2013.01); *H01M 2200/10* (2013.01); *H01M 2200/20* (2013.01); *H01M 2220/20* (2013.01); *Y02E 60/122* (2013.01)

(56) References Cited

U.S. PATENT DOCUMENTS

| | | |
|---|---|---|
| 2012/0040235 A1 | 2/2012 | Cho et al. |
| 2013/0059179 A1 | 3/2013 | Hosaka et al. |
| 2015/0132621 A1* | 5/2015 | Henrici ............... H01M 2/0275 429/90 |
| 2015/0340663 A1 | 11/2015 | Minagata et al. |

FOREIGN PATENT DOCUMENTS

| | | |
|---|---|---|
| JP | 2001-185124 A | 7/2001 |
| JP | 2004-327047 A | 11/2004 |
| JP | 2005-44523 A | 2/2005 |
| JP | 2008-103245 A | 5/2008 |
| JP | 2010-527134 A | 8/2010 |
| JP | 2011-96664 A | 5/2011 |
| JP | 2011-519124 A | 6/2011 |
| JP | 2013-535791 A | 9/2013 |
| JP | 2013-235653 A | 11/2013 |
| WO | 2011/145608 A1 | 11/2011 |
| WO | 2014/002647 A1 | 1/2014 |
| WO | 2016/027673 A1 | 2/2016 |

\* cited by examiner

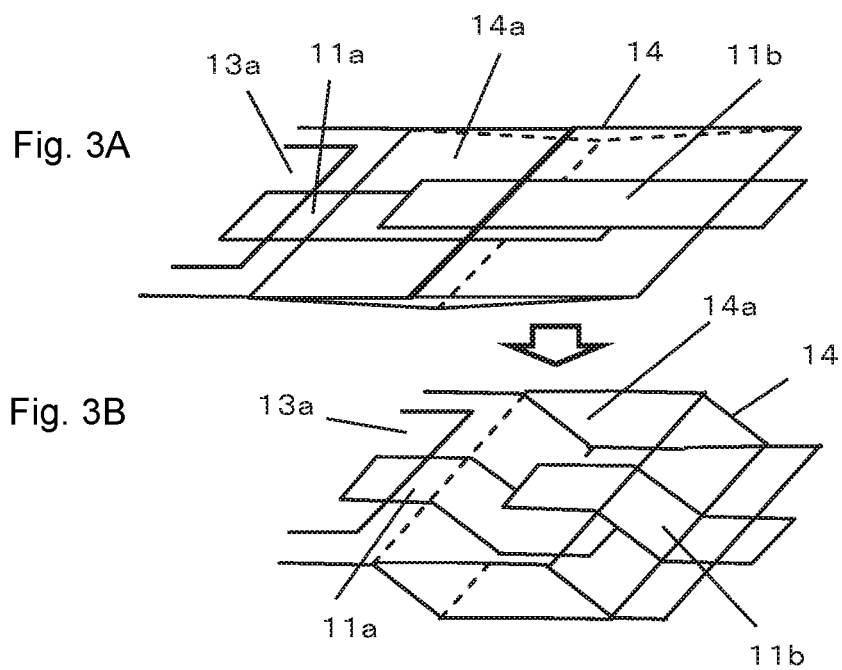
Fig. 3A
Fig. 3B
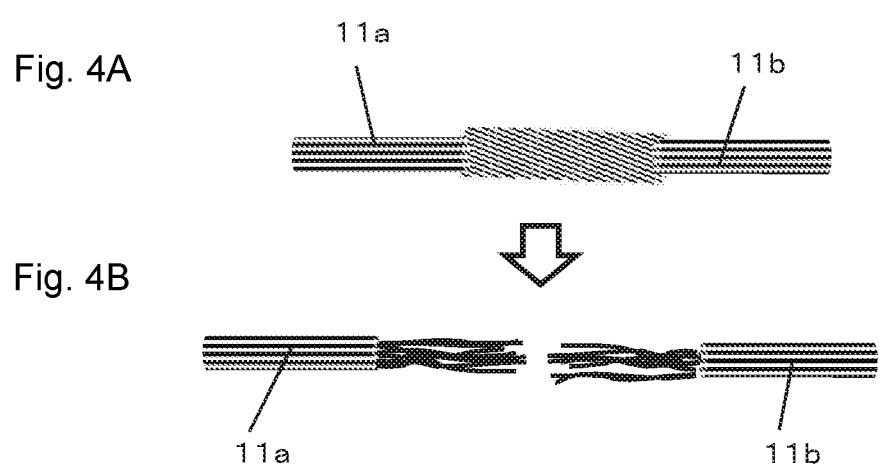
Fig. 4A
Fig. 4B

Fig. 5A
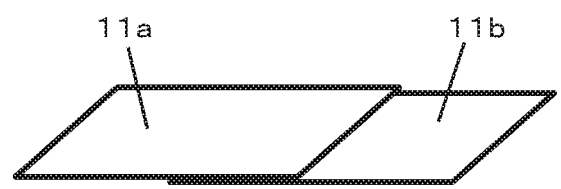
Fig. 5B
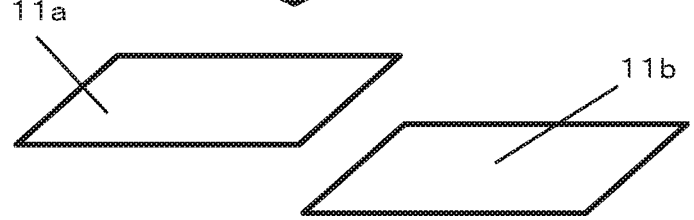
Fig. 6A
Fig. 6B
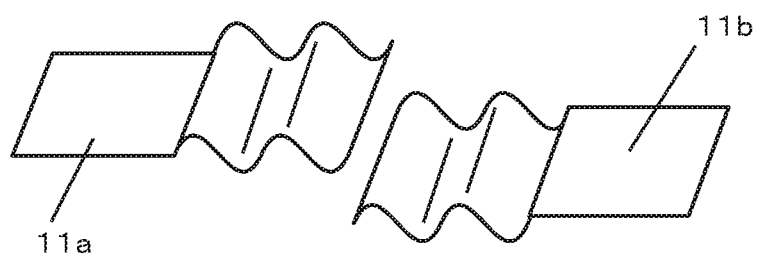

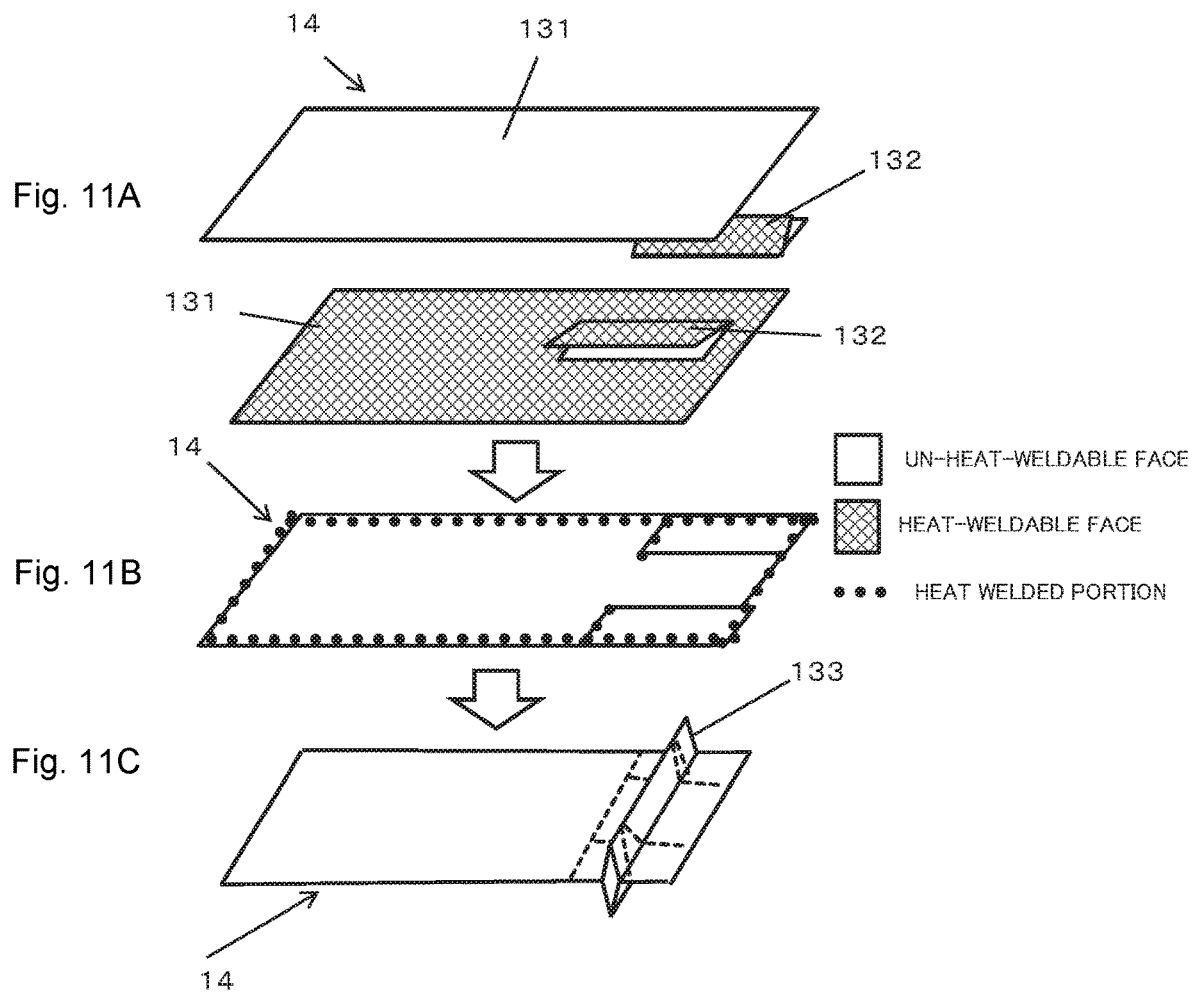

BATTERY AND METHOD FOR MANUFACTURING SAME

CROSS REFERENCE TO RELATED APPLICATIONS

This application is a National Stage of International Application No. PCT/JP2016/053756 filed Feb. 9, 2016, claiming priority based on Japanese Patent Application No. 2015-028406, filed Feb. 17, 2015, the contents of all of which are incorporated herein by reference in their entirety.

TECHNICAL FIELD

The present invention relates to a battery having a function of interrupting current when abnormality occurs and thereby preventing excessive heat generation.

BACKGROUND ART

Nonaqueous electrolyte secondary batteries such as lithium ion secondary batteries have various advantages like high energy density, small self-discharge and excellent long-term reliability, and are already commercialized as batteries for notebook personal computers or cellular phones. However, in recent years, since electronic devices are equipped with higher functions and the use of electronic devices for electric cars is advancing, the development of lithium ion secondary batteries having higher energy density is underway.

On the other hand, the higher the energy capacity or the energy density of a battery becomes, the more likely the battery temperature is to rise when a short circuit occurs due to an impact from outside or a circuit failure or when the battery is overcharged. At this time, oxygen desorbing reaction of an active material or thermal decomposition reaction of an electrolyte occurs, which causes the battery to further generate heat. If the battery generates excessive heat, the battery may also lead to thermal runaway which makes temperature control impossible.

Conventionally, various interrupting mechanisms have been disclosed as solutions to heat generation of batteries. For example, Patent Literature 1 discloses that a compound which is oxidized at a predetermined voltage or higher is added to an electrolyte. By heat generation at the time of oxidation, this compound induces decomposition of components of the electrolyte or vaporization, causes the inner pressure of the battery to increase, and the pressure increase activates safety means (CID: Current Interrupt Device) to effectively function. Patent Literature 2 discloses an interrupting mechanism with a heat fuse incorporated into a current output conductor. Patent Literature 3 discloses an interrupting mechanism having a structure in which a battery case that houses an electrode assembly is made expandable in a direction in which an electrode lead is led out, the battery case expands when an inner pressure of the battery increases and a joint between the electrode lead and an electrode tab is separated.

Patent Literature 4 discloses a battery having a structure in which a battery case that houses an electrode assembly is formed of a bag of a heat sealable film and an interior of the bag is divided into a first chamber that houses the electrode assembly and a second chamber adjacent to the main chamber, and through which an electrode lead passes. A partition sealing section that partitions the first chamber from the second chamber includes a weak sealed portion. Inside the second chamber, the electrode lead is provided with an interrupting mechanism whereby the electrode lead is disconnected when an inner pressure increases. According to the battery in such a configuration, when an inner pressure in the first chamber increases due to the occurrence of abnormality, the weak sealed portion is opened, the second chamber inflates and the electrode lead is thereby disconnected.

Patent Literature 5 discloses a sulfide secondary battery in which a battery cell covered with an interior material is further covered with an exterior material and a material for detoxifying hydrogen sulfide gas is provided between the battery cell and the exterior material. According to such a configuration, the hydrogen sulfide gas generated by deterioration, breakage or the like of the battery is trapped so as not to leak to the outside of the battery, and is detoxified.

CITATION LIST

Patent Literature

Patent Literature 1: National Publication of International Patent Application No. 2010-527134
Patent Literature 2: National Publication of International Patent Application No. 2011-519124
Patent Literature 3: National Publication of International Patent Application No. 2013-535791
Patent Literature 4: Japanese Patent Application Laid-Open No. 2000-067846
Patent Literature 5: Japanese Patent Application Laid-Open No. 2008-103245

SUMMARY OF INVENTION

Technical Problem

Batteries can be roughly divided into two categories. One is called a "cylindrical battery" or "square battery", an inner electrode of which is wound and the other is a "laminated battery" in which electrodes are laminated. Laminated batteries tend to be used for large batteries by making account of heat dissipation performance. From the viewpoints of weight reduction, heat dissipation performance and further cost reduction, an outer package tends to be manufactured using a laminated film whose metal foil is coated with a resin film from using a metallic case.

Viewing the above-described prior art in view of this tendency, the invention disclosed in Patent Literature 1 operates the safety means utilizing the rise in the internal pressure of the battery due to the generation of gas. Therefore, the battery effectively functions in the case of a battery having an outer package such as a metallic case which does not deform, but the safety means cannot fully function with a battery having a film as it outer package.

The structure described in Patent Literature 2 relates to a battery having a high heat dissipation laminated electrode, that is, a battery having a laminated film as its outer package, but since a thermal fuse used in a large battery through which a large current flows has a large resistance value in the fuse part, which may produce energy loss.

The structure described in Patent Literature 3 can detect a gas generated when abnormality occurs in the laminated outer package and interrupt the electric circuit, avoiding the above-described energy loss, and is therefore excellent. However, since it has a structure with the folded outer package laminate, the electrodes may be displaced by vibration and the electrodes may contact each other, resulting in ignition. Moreover, even when there is no abnormality in the battery, if an electrolyte therein slightly evaporates due to an ambient temperature or when the battery is used for a long period of time, a volatile component is generated due to electrolysis of the electrolyte. In this case, the electrodes may still be displaced by vibration. If such a phenomenon occurs when the battery is transported or when the battery is used for an automobile, not only the battery performance may deteriorate but also thermal runaway may be induced due to a short circuit in the electrodes.

The structure described in Patent Literature 4 requires the gas produced in the first chamber to destroy the weak sealed portion, pass therethrough, enter the second chamber and cause the second chamber to inflate. If a sealed portion other than the weal sealed portion destroyed earlier than or at the same time with the weak sealed portion, the gas is directly discharged to the outside of the battery, the internal pressure of the second chamber does not rise to cause no current interruption. In addition, depending on the sealing conditions such as the pressing force to the package body when forming the sealed portion, the mechanical strength of the package body may be lowered around the sealed portion. Even in such a case, the package body itself may be destroyed earlier than the weak sealed portion, and the gas may be discharged directly to the outside of the battery. Therefore, it is difficult to reliably prevent thermal runaway.

The structure described in Patent Literature 5, gas generated due to abnormality of the battery cell is trapped in the exterior material even if the interior material is broken. However, in the case where, for example, the overcharged state continues, gas continues to be generated further, and finally the outer packaging material may be broken.

It is an object of the present invention to provide a battery which can surely interrupt current at the time of temperature increase so that excessive heat generation does not occur at the occurrence of abnormality.

Solution to Problem

According to an aspect of the present invention, a battery is provided, the battery includes a battery element including a positive electrode and a negative electrode;
  an inner package forming a first chamber for enclosing the battery element;
  an outer package covering at least a part of the inner package so as to form a second chamber surrounding at least a part of the first chamber;
  a pair of terminals electrically connected to the positive electrode and the negative electrode and led out to the outside of the outer package,
  wherein at least one of the pair of terminals has a first terminal and a second terminal arranged so as to be electrically connected in the second chamber, and
  a gas generating material is enclosed in the first chamber or the second chamber, the gas generating material generates gas at a predetermined temperature or higher or a predetermined voltage or higher.

In the battery of the present invention, the battery may be configured such that the battery element includes an electrolyte containing a gas generating material, the internal pressure of the first chamber rises due to the gas generated from the gas generating material, the electrical connection between the first terminal and the second terminal is interrupted by breaking the inner package and inflating the second chamber with the gas discharged from the first chamber, or that an electrolyte containing the gas generating material is enclosed in the second chamber and the electrical connection between the first terminal and the second terminal is interrupted by inflating the second chamber with the gas generated from the gas generating material.

According to another aspect of the present invention, a method for manufacturing a battery is provided, the method includes steps of:
  enclosing a battery element including a positive electrode and a negative electrode in a first chamber formed by an inner package, after connecting a pair of first terminals to the positive electrode and the negative electrode, with the pair of first terminals led out from the inner package; and
  enclosing the inner package in a second chamber formed outside of the inner package by an outer package, wherein the step includes arranging a second terminal such that at least one first terminal of the pair of first terminal is electrically connected in the second chamber and covering at least a part of the inner package with the outer package;
  wherein the step of enclosing the battery element in the first chamber or the step of enclosing the inner package in the second chamber includes enclosing a gas generating material, which generate gas at a predetermined temperature or higher or a predetermined voltage or higher, together.

Advantageous Effects of Invention

According to the present invention, excessive temperature rise and overcharge of the battery can be prevented, since the gas is generated in the battery when the temperature or the voltage rises due to the occurrence of abnormality of the battery and the electrical connection between the terminals can be interrupted by utilizing the inflation of the second chamber (outer package) by the generated gas.

BRIEF DESCRIPTION OF DRAWINGS

FIGS. 3A and 3B are diagrams showing another embodiment of the current interrupting mechanism used in the present invention.

FIGS. 4A and 4B are diagrams showing another embodiment of the current interrupting mechanism used in the present invention.

FIGS. 5A and 5B are diagrams showing another embodiment of the current interrupting mechanism used in the present invention.

FIGS. 6A and 6B are diagrams showing another embodiment of the current interrupting mechanism used in the present invention.

FIGS. 11A, 11B and 11C are diagrams showing a package in which the second chamber can expand in a terminal direction.

DESCRIPTION OF EMBODIMENTS

Figure 1A:
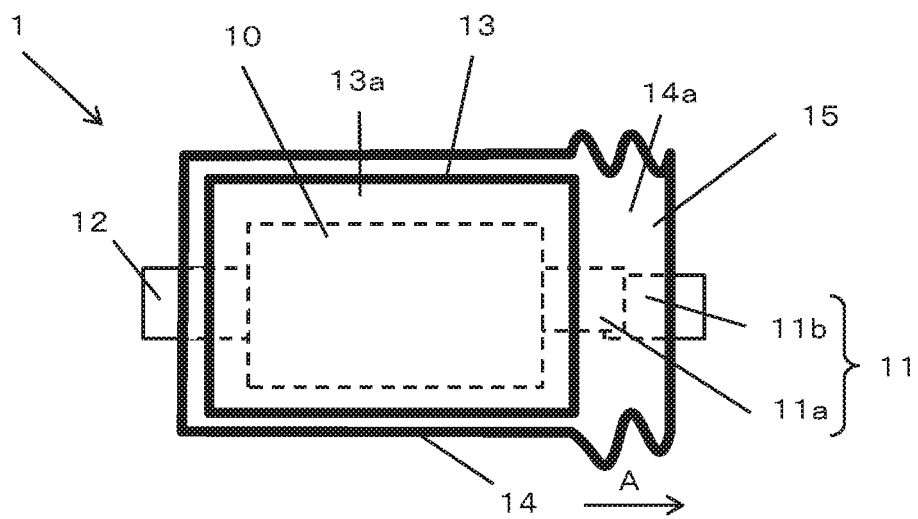
FIG. 1A is a plan view schematically illustrating a structure of a battery according to an embodiment of the present invention.
Figure 1B:
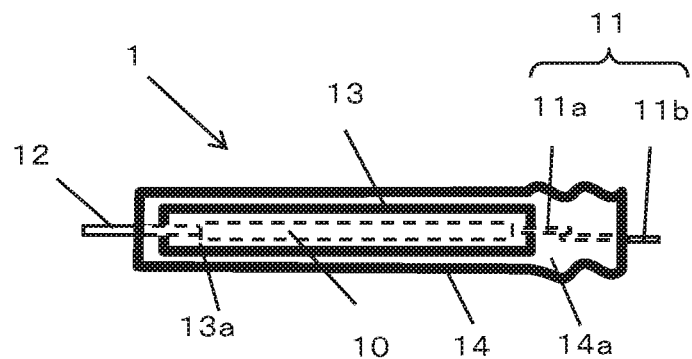
FIG. 1B is a side view schematically illustrating the structure of the battery shown in FIG. 1A.

FIGS. 1A and 1B show schematic views of a battery 1 according to an embodiment of the present invention which includes a battery element 10, an inner package 13 forming a first chamber 13a, an outer package 14 that seals the inner package 13 so as to form a second chamber 14a outside of the inner package and a pair of terminals 11, 12.

The battery element 10 includes a positive electrode, a negative electrode, a separator and an electrolyte and is sealed in the first chamber 13a. The inner package 13 has flexibility, preferably formed of a weldable laminate film and forms the first chamber 13a which seals the battery element 10 by joining the outer peripheral portion by thermal welding or ultrasonic welding or the like. Like the inner package 13, the outer package 14 also has flexibility, can be formed of a weldable laminate film and forms the second chamber 14a which seals the inner package 13 by joining the outer peripheral portion by thermal welding or ultrasonic welding or the like. In other words, the battery element 10 is enclosed in a double chamber of the first chamber 13a formed by the inner package 13 and the second chamber 14a formed by the outer package 14. The outer package 14 surrounds the inner package 13, so that the second chamber 14a surrounds the first chamber 13a.

The first chamber 13a and the second chamber 14a are formed as independent chambers in which the interior of each of the chambers is isolated from each other. The joining of the inner package 13 for forming the first chamber 13a and the joining of the outer package 14 for forming the second chamber 14a are not limited to welding, but may be using an adhesive. Joining using an adhesive or combined use of joining using an adhesive and joining using welding can widen a range of selection of a material of the outer package.

The pair of terminals 11, 12 are electrically connected to the positive electrode and the negative electrode of the battery element 10 respectively and are led out to the outside of the outer package 14 via the second chamber 14a. The arrangement of the terminals 11, 12 may be arbitrary. In the illustrated embodiment, the pair of terminals 11, 12 are arranged so as to be led out from the opposite sides of the outer package 14, but they may be arranged so as to be led out from the same side or two adjacent sides.

One terminal 11 of the pair of terminals 11, 12 has a first terminal 11a and a second terminal 12a. One end of the first terminal 11a is electrically connected to the positive electrode or the negative electrode of the battery element 10, and the other end is arranged so as to be led out from the inner package 13 and located in the second chamber 14a. One end of the second terminal 11b is positioned in the second chamber 14a and the other end is arranged to be led out from the second chamber 14a to the outside of the outer package 14. The first terminal 11a and the second terminal 11b are normally in contact with each other so as to partially overlap each other within the second chamber 14a, and are electrically connected.

In the illustrated embodiment, it is shown that only one terminal 11 has a first terminal 11a and a second terminal 11b, but the other terminal 12 may have a first terminal and a second terminal or terminals 11 and 12 may have a first terminal and a second terminal. Further, for example, in the case of a terminal not having the first terminal and the second terminal such as the terminal 12 in the illustrated embodiment, in the present invention, the terminal itself may be referred to as a first terminal.

The electrolyte includes a gas generating material 15 that generates gas at a predetermined temperature or higher or a predetermined voltage or higher. Therefore, when the temperature of the battery element 10 rises to a predetermined temperature or higher or the voltage of the positive electrode rises to a predetermined voltage or higher due to, for example, abnormality of the battery 1 such as overcharge, or the like, gas is generated by the gas generating material 15. In the present invention, this gas is used to interrupt the electrical connection between the first terminal 11a and the second terminal 11b. The basic mechanism for interrupting the electrical connection between the first terminal 11a and the second terminal 11b using the gas generated in the second chamber 13a is as follows.

As the gas is generated, the internal pressure of the first chamber 13a rises. An increase in internal pressure causes breakage of the inner package 13 such as cracking of the inner package 13 or peeling of the joined portion and gas is discharged from the first chamber 13a to the second chamber 14a through the broken portion. As the gas is discharged into the second chamber 14a, the second chamber 14a expands and the electrical connection between the first terminal 11a and the second terminal 11b is interrupted, more specifically, the terminals are separated. Therefore, the first terminal 11a and the second terminal 11b are arranged so that the electrical connection is interrupted by the expansion of the second chamber 14a, and thus the structure including the gas generating material 15, the inner package 13, the outer package 14, the first terminal 11a and the second terminal 11b may be referred to as a current interrupting mechanism.

As the gas generating material 15, any one of
(A) a compound generating gas at a predetermined temperature or higher,
(B) a compound generating gas at a predetermined voltage or higher, and
(C) a mixture composed of a compound generating heat at a predetermined voltage or higher and a compound generating gas at a predetermined temperature or higher,
or a combination of two or can be used.

The compound generating gas at a predetermined temperature includes a material that generates gas at a temperature higher than a normal temperature and equal to or higher than a predetermined temperature at which thermal runaway of the battery does not occur, and generation of the gas can cause the second chamber 14a to expand indirectly due to discharge of the generated gas from the first chamber 13a. Here, "normal temperature" refers to a temperature range of 20±15° C. (that is, 5° C. to 35° C.) defined in JIS Z 8703.

The compound generating gas at a predetermined voltage or higher includes a material that generates gas at a voltage equal to or higher than a predetermined voltage at which thermal runaway of the active material of the battery does not occur is applied to the battery, and generation of the gas can cause the second chamber 14a to expand indirectly due to discharge of the generated gas from the first chamber 13a.

The compound generating gas at a predetermined voltage or higher includes a material that generates gas at a voltage equal to or higher than a predetermined voltage at which thermal runaway of the active material of the battery does not occur is applied to the battery. By using a mixture of this compound and the compound generating gas at a predetermined temperature or higher, the compound generating gas at a predetermined temperature or higher generates heat due to the heat generated by the compound generating heat a predetermined voltage or higher. As a result, generation of the gas can cause the second chamber 14a to expand indirectly due to discharge of the generated gas from the first chamber 13a.

In any of the above cases, the inner package 13 is ruptured by rising of the internal pressure of the first chamber 13a due to the generation of gas, and the second chamber 14a is expanded by the release of gas from the broken portion of the inner package 13. Therefore, it is preferable that the inner case 13 is provided with a pressure valve (not shown) which opens at a predetermined pressure or a weak sealed portion having the same function as that of the pressure valve, for example, a portion which is more easily peelable than other portion formed by partially thinning the welding portion or joining portion of the inner package 13. This makes it possible to stop the function as a battery more securely at the initial stage of occurrence of abnormality. Moreover, by forming the weak sealed portion on the inner package 13, it becomes possible to discharge the gas from the specific portion. As a result, for example, it is possible to design such that the gas can be easily guided to a portion where the first terminal 11a and the second terminal 11b of the current interrupting mechanism are disposed, or the like.

Since the second chamber 14a surrounds the first chamber 13a and is in contact with the outside air, it is possible to occupy substantially the entire outer size of the battery 1 with the second chamber 14a, and the gas discharged into the second chamber 14a from the first chamber 13a is relatively easily cooled in the second chamber 14a. As a result, after the electrical connection between the first terminal 11a and the second terminal 11b is interrupted, even if the gas continues to be generated in the first chamber 13a due to the residual heat, the gas is discharged into the second chamber 14a and cooled in the second chamber 14a, and returned to liquid in some cases. Thus, excessive expansion of the second chamber 14a is suppressed, and breakage of the second chamber 14a, that is, leakage of gas from the second chamber 14a can be prevented.

In addition, since the first chamber 13a is surrounded by the second chamber 14a and is not in contact with the outside air, when abnormality such as overcharge occurs, heat generated from the battery element 10 due to abnormality acts directly on the gas generating material without escaping the outside of the battery 1. Therefore, when an abnormality occurs, gas can be efficiently generated in the first chamber 13a, and as a result, when an abnormality occurs, the time from abnormality occurrence to expansion of the second chamber 14a is relatively short. That is, it is possible to interrupt the electrical connection between the first terminal 11a and the second terminal 11b in a high response.

It is possible to enclose the compound and mixture in the second chamber 14a instead of in the first chamber 13a, that is, the first chamber 13a is filled with an electrolyte not containing the above-mentioned compound and the like, and the second chamber 14a is filled with an electrolyte containing the above compounds and the like. Such configuration enables the second chamber 14a to inflate directly and the time lag from the generation of gas to the interruption of the electrical connection can be reduced. The compound and the like are isolated from the battery element 10 in the first chamber 13a by enclosing the compound and the like in the second chamber 14a. Therefore, even if the compound or the like contain materials that affect the battery characteristics, it is possible to use without adversely affecting the battery characteristics without being concerned.

In the present embodiment, the outer package 14 is configured to extend in a direction (direction of arrow A) where the second terminal 11b is led out. In the present invention, "terminal direction" means a direction in which the second terminal 11b is led out.

Figure 2:
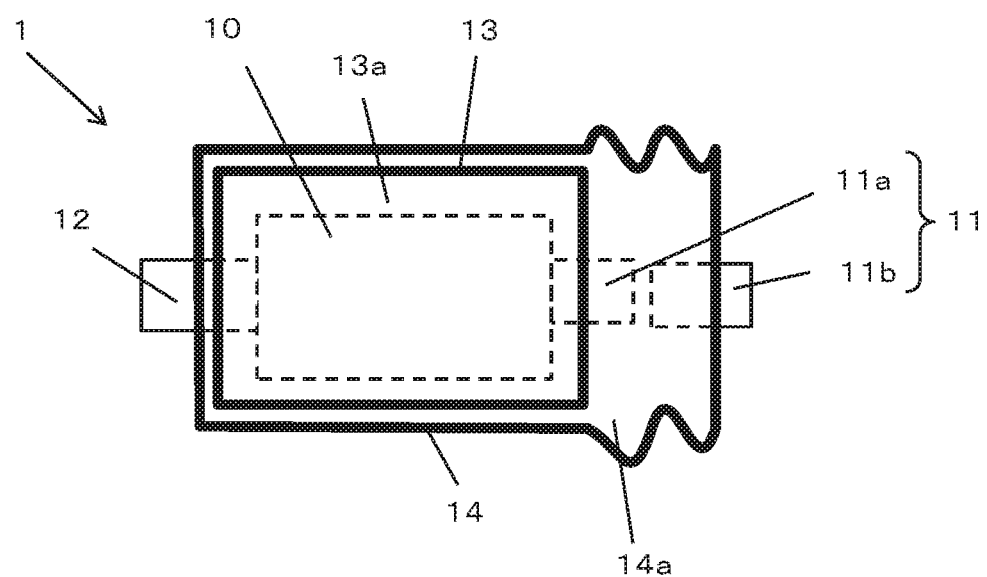
FIG. 2 is a plan view illustrating a second chamber expanding in a terminal direction in the battery shown in FIG. 1A.

The second terminal 11b is a terminal to be connected to the electric wiring outside the battery 1, and is fixed to the outer package 14 so that the second terminal 11b is led out to the outside of the outer package 14 in a state one end thereof is positioned in the second chamber 14a. Further, the second terminal 11b is in a positional relationship in which although the one end of the second terminal 11b overlaps and contacts with the first terminal 11a before the outer package 14 expands, the second terminal 11b moves in accordance with the extension of the outer package 14 to separate from the first terminal 11a, as shown in FIG. 2. As the first terminal 11a and the second terminal 11b are separated from each other, the electrical connection between the first terminal 11a and the second terminal 11b is interrupted, and excessive heat generation of the battery 1 is prevented. In order to secure the contact between the first terminal 11a and the second terminal 11b before the outer package 14 expands, it is preferable that the interior of the second chamber 14a is in a vacuum state to the extent that the opposing portions of the outer package 14 at the second chamber 14a are in close contact with each other before the gas is discharged to the second chamber 14a. Such a vacuum state can be realized by performing joining of the outer package 14 for forming the second chamber 14a under reduced pressure.

The aforementioned components will be described in more detail below.

(Current Interrupting Mechanism)

The current interrupting mechanism is not limited to the configuration shown in the aforementioned embodiment, but any given structure can be adopted as long as it is configured so that the first terminal 11a is separated from the second terminal 11b by an inflation of the second chamber 14.

For example, As shown in FIG. 3, when the second chamber 14a is configured to inflate in a thickness direction of the second chamber 14a which is a direction in which surfaces of the outer package 14 face each other, it is possible to cause the first terminal 11a to separate from the second terminal 11b in the thickness direction of the second chamber 14a. For that purpose, the first terminal 11a may be joined to one of inner surfaces of the outer package 14 facing each other in the second chamber 14a and the second terminal 11b may be joined to the other inner surface. Before the inflation of the second chamber 14a due to generation of gas, the first terminal 11a and the second terminal 11b are overlapping and in contact with each other and are electrically connected (A). Through action of the gas generating material accompanying a temperature rise and pressurization, when a gas is generated in the first chamber 13a and the second chamber 14a is inflated by the discharged gas from the first chamber 13a, the outer package 14 is separated in the direction in which the surfaces thereof face each other (B). This causes the first terminal 11a to separate from the second terminal 11b, interrupting current between both terminals.

A general adhesive can be used for joining of the first terminal 11a and the second terminal 11b to the outer package 14. Any type of adhesive can be used and can be selected according to the purpose as appropriate. A flexible adhesive having acrylic resin, styrene resin or butadiene resin as main agent is preferable because it has excellent followability with respect to the outer package 14 or excellent flexibility. Furthermore, isocyanate-based urethane resin or the like is preferable because its working time is shortened Use of epoxy resin, amide resin or the like is preferable because of its excellent heat-resistance. Conducting thermal welding using polyethylene resin or polypropylene resin is preferable because joining can be performed in an extremely short time. In this case, use of the outer package 14, an inner surface of which is coated with such resin is preferable because this facilitates joining by thermal welding.

The material of the first terminal 11a is preferably a material which will not corrode inside the battery 1. More specifically, gold, platinum, copper, carbon, stainless steel, nickel or the like can be used for the first terminal 11a connected to a negative electrode. Aluminum or the like may be used for the first terminal 11a connected to a positive electrode. The material of the second terminal 11b is not particularly limited if it is a conductive material, and copper, aluminum or the like is preferable because it is highly conductive and inexpensive. Use of nickel, iron, stainless steel or the like is preferable because it can make a battery tab with high strength.

As another embodiment of the current interrupting mechanism, it is also possible to use the first terminal 11a and the second terminal 11b electrically connected by being temporarily fixed in contact with each other. The strength of the temporary fixing is deemed to be such a degree of strength that the temporary fixing of the first terminal 11a and the second terminal 11b is released due to an inflation of the second chamber 14a. It is possible to use a frictional force between the first terminal 11a and the second terminal 11b for the temporary fixing.

When the current interrupting mechanism is structured such that the first terminal 11a and the second terminal 11b are electrically connected by the temporary fixing, it is possible to make up the first terminal 11a and the second terminal 11b, for example, using a bundle of a plurality of conductors as shown in FIG. 4. The bundles of conductors of the first terminal 11a and the second terminal 11b are untied at their respective ends and by causing the conductors of the first terminal 11a and the conductors of the second terminal 11b to entwine with each other, it is possible to temporarily fix both terminals while keeping them electrically connected. The second chamber is configured to be able to inflate in the direction in which the first terminal 11a and the second terminal 11b are connected and when the second chamber inflates, the second terminal 11b is pulled toward a direction in which the second terminal 11b goes away from the first terminal 11a. When the second terminal 11b is pulled, the entwining of the conductors is released and current between the first terminal 11a and the second terminal 11b is interrupted.

As shown in FIG. 5, even in a case where the first terminal 11a and the second terminal 11b are configured by using tabular conductors, it is also possible to temporarily fix both terminals by forming surfaces facing each other (contact surfaces) of the first terminal 11a and the second terminal 11b into rough surfaces having many protrusions and recesses such as a "file." Since the surfaces facing each other of the first terminal 11a and the second terminal 11b have many protrusions and recesses, when both terminals have their surfaces facing each other in contact with each other, a frictional force between both surfaces makes it hard for the first terminal 11a and the second terminal 11b to laterally slide. As a result, it is possible to keep the state in which both surfaces are kept in contact with each other in a good condition until the second chamber inflates, causing the first terminal 11a to separate from the second terminal 11b. Thus, when the first terminal 11a and the second terminal 11b are configured so as to keep their contact state using the frictional force resulting from many protrusions and recesses, it is possible to make surer the contact between the first terminal 11a and the second terminal 11b by keeping the interior of the second chamber in a decompressed condition (vacuum state) before the second chamber inflates.

Figure 7A:
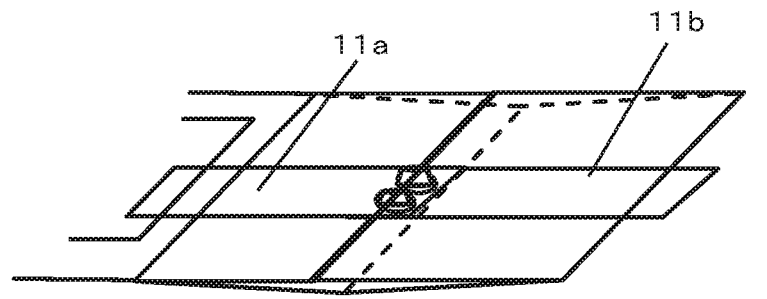
FIGS. 7A and 7B are diagrams showing another embodiment of the current interrupting mechanism used in the present invention.
Figure 7B:
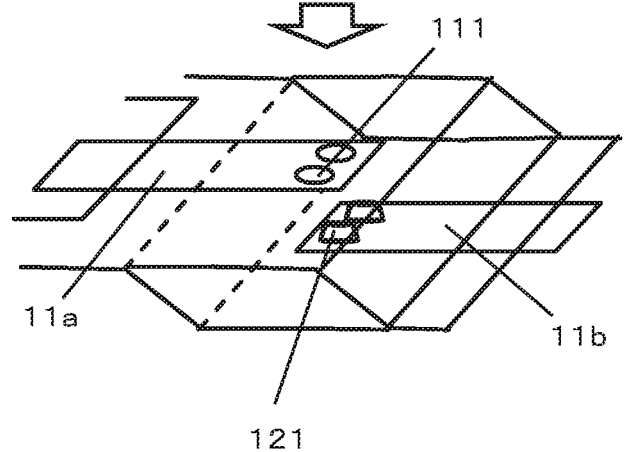

When the first terminal 11a and the second terminal 11b are tabular terminals, it is preferable to form protrusions and recesses so as to mesh or engage with each other. This makes it possible to increase the frictional force between the first terminal 11a and the second terminal 11b and more effectively prevent the first terminal 11a from separating from the second terminal 11b during normal operation. Examples of protrusions and recesses include bending parts of the first terminal 11a and the second terminal 11b into corrugated forms that mesh with each other as shown in FIG. 6 and providing a concave portion 111 and a convex portion 121 that engage with each other as shown in FIG. 7 or the like.

When the first terminal 11a and the second terminal 11b are bent into corrugated forms, the number of corrugated forms of the first terminal 11a and the second terminal 11b, cycles of the corrugated forms and height difference between the corrugated forms or the like may be optionally determined. When the concave portion 111 and the convex portion 121 are formed in the first terminal 11a and the second terminal 11b, the number of concave portions 111/convex portions 121, depths of the concave portion 111, height of the convex portion 121, shapes of the concave portion 111/convex portion 121 or the like may be optionally determined. The concave portion 111 and the convex portion 121 may be formed on any side of the first terminal 11a and the second terminal 11b or may be mixed. The concave portion 111 may be formed as a hole as shown in FIG. 7 or may be formed as a recess. When the concave portion 111 is formed as a hole, the first terminal 11a and the second terminal 11b can be coupled together more strongly. When the concave portion 111 is formed as a recess, working is easier.

Figure 8A:
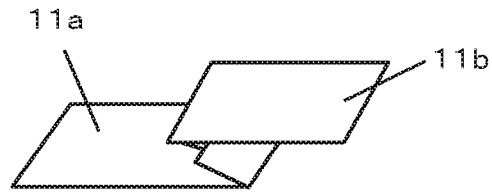
FIGS. 8A and 8B are diagrams showing another embodiment of the current interrupting mechanism used in the present invention.
Figure 8B:
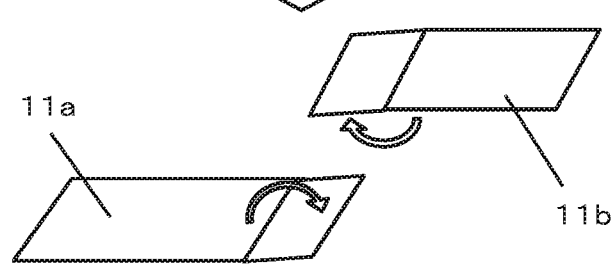

As another embodiment in which the first terminal 11a and the second terminal 11b are temporarily fixed while being kept in contact with each other, a structure shown in FIG. 8 in which a distal end portion of the first terminal 11a and a distal end portion of the second terminal 11b are folded and the folded portions are caused to engage with each other like a hook may be adopted (A). When the second chamber is inflated, the first terminal 11a and the second terminal 11b are pulled in a direction in which they separate away from each other, the engagement between both terminals is released and current between both terminals is interrupted (B). In case of the embodiment shown in FIG. 8, it is preferable to seal the second chamber in a decompressed state and cause the first terminal 11a and the second terminal 11b to come into close contact with each other under an atmospheric pressure received by the outer package. It is thereby possible to prevent positional displacement between the first terminal 11a and the second terminal 11b.

Figure 9A:
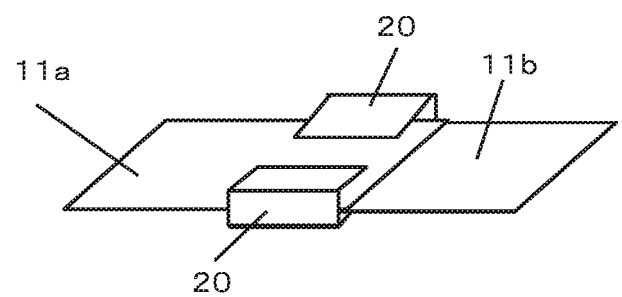
FIGS. 9A and 9B are diagrams showing another embodiment of the current interrupting mechanism used in the present invention.
Figure 9B:
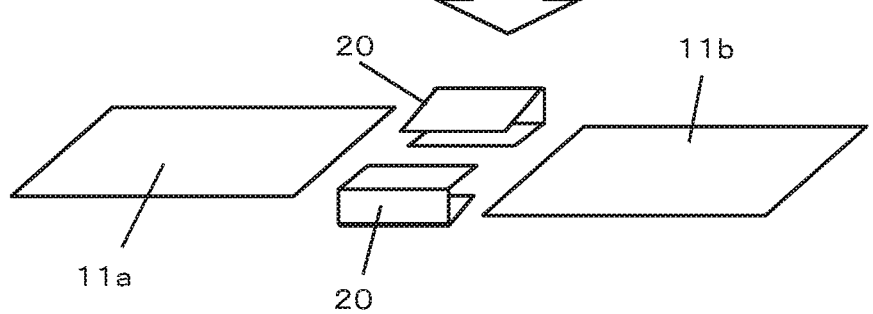

The current interrupting mechanism may include clip(s) 20 that temporarily fix the first terminal 11a and the second terminal 11b as shown in FIG. 9. The clip 20 is intended to assist the first terminal 11a and the second terminal 11b which are in contact with each other in preventing deviation. Therefore, any clip may be used as the clip 20 as long as it can cause both terminals to remain in contact with each other by sandwiching the overlapping portion of the first terminal 11a and the second terminal 11b. When the clip 20 is used, the clip 20 functions effectively when the second chamber is configured to inflate in the direction in which the terminal is led out. The clip 20 is also applicable to a case where protrusions and recesses are formed in the first terminal 11a and the second terminal 11b.

Figure 10A:
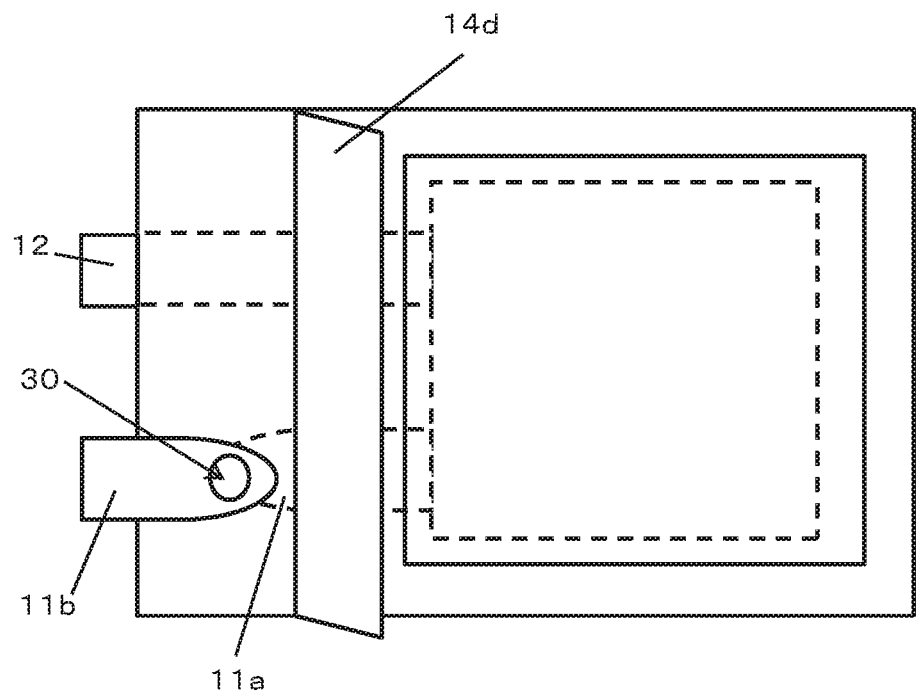
FIG. 10A is a plan view schematically illustrating another embodiment of the current interrupting mechanism used in the present invention.
Figure 10B:
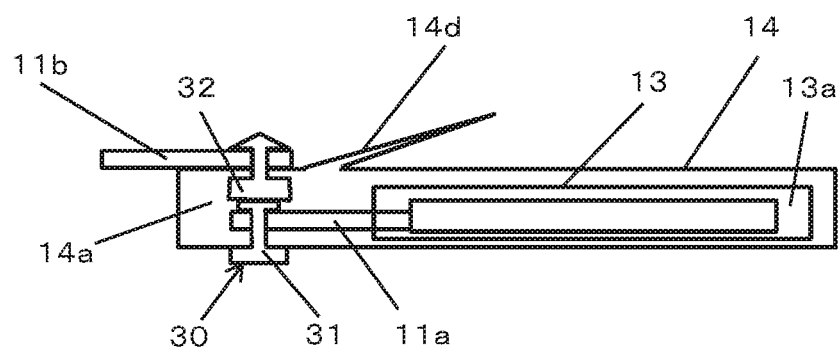
FIG. 10B is a schematic view seen from the side of the current interrupting mechanism shown in FIG. 10A.

Alternatively, as shown in FIGS. 10A and 10B, the current interrupting mechanism may include a snap 30 that temporarily fixes the first terminal 11a and the second terminal 11b (The snap is also called "hock" and includes a magnet type and a spring type.). The snap 30 includes a male connector 31 and a female connector 32 that engage with each other, one of which is electrically connected and fixed to the first terminal 11a and the other of which is electrically connected and fixed to the second terminal 11b. The male connector 31 and the female connector 32 engage with each other before the second chamber 14a inflates, and the first terminal 11a and the second terminal 11b are electrically connected. On the other hand, when the second chamber 14a inflates in the thickness direction of the battery, the engagement between the male connector 31 and the female connector 32 is released and current between the first terminal 11a and the second terminal 11b is interrupted.

Any structure can be used as the snap 30 as long as the two members can releasably engage with each other. As an example, in an embodiment shown in FIG. 10A and 10B, the male connector 31 and the female connector 32 are respectively fixed to the outer package 14 by penetrating the outer package 14 at positions facing each other in the region in which the first terminal 11a and the second terminal 11b of the outer package 14 are overlapped. Since the electrical connection between the first terminal 11a and the second terminal 11b is made when the male connector 31 and the female connector 32 engage with each other, the first terminal 11a and the second terminal 11b need not be in direct contact with each other. Thus, in the present embodiment, the second terminal 11b is disposed outside the outer package 14 to reduce the number of parts interposed between the sealing section and the outer package 14. This makes it possible to favorably keep the second chamber 14a air tight. However, the second terminal 11b may also be disposed inside the second chamber 14a as in the case of the aforementioned embodiment.

Figure 10C:
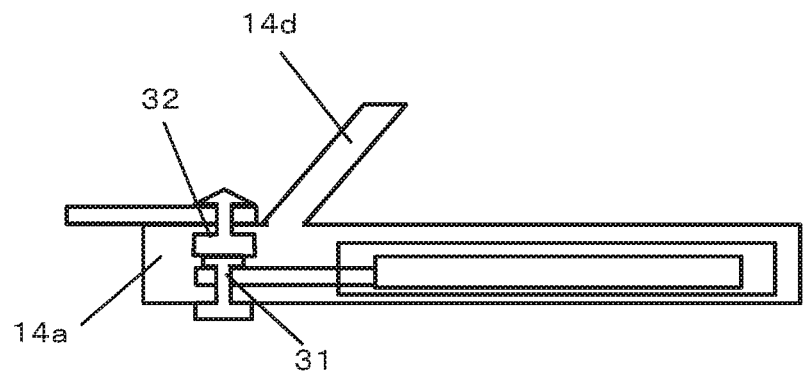
FIG. 10C is a diagram illustrating the current interrupting mechanism shown in FIG. 10B when the second chamber starts to inflate.
Figure 10D:
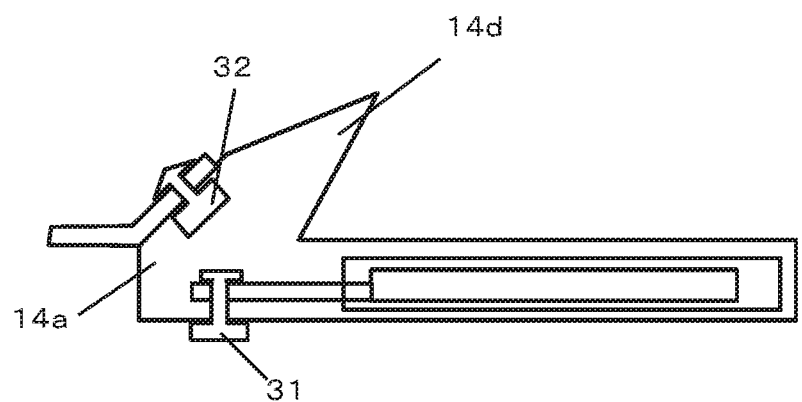
FIG. 10D is a diagram illustrating the current interrupting mechanism shown in FIG. 10C when the second chamber further inflates, and a male connector and a female connector of a snap are disengaged from each other.

In the present embodiment, the second chamber 14a includes an inflatable portion 14d between the region where the snap 30 is disposed and the first chamber 13a in order to facilitate disengagement between the male connector 31 and the female connector 32 when the second chamber 14a inflates. The inflatable portion 14d is a portion formed by mountain-folding the outer package 14 and is kept substantially flat before the second chamber 14a inflates. As the second chamber 14a inflates, the inflatable portion 14d starts to inflate as shown in FIG. 10C, the side of the second chamber 14a that includes the inflatable portion 14d eventually inflates a great deal, releasing the engagement between the male connector 31 and the female connector 32 as shown in FIG. 10D. Thus, since the second chamber 14a includes the inflatable portion 14d, it is possible to cause the second chamber 14a to inflate more and consequently more reliably interrupt current by the inflation of the second chamber 14a.

In the temporary fixing using the snap 30, a joining force in a direction perpendicular to the engagement direction between the male connector 31 and the female connector 32 is relatively high. Therefore, the temporary fixing using the snap 30 has high resistance to vibration in an in-plane direction perpendicular to the thickness direction of the battery. In other words, even when strong vibration acts in this direction, it is possible to obtain a structure whereby the first terminal 11a and the second terminal 11b are less likely to deviate from each other. Note that since the second chamber is formed by joining the outer package under a reduced pressure, the atmospheric pressure can complement the joining force of the snap 30. In this case, it is possible to provide high resistance to vibration also in the direction of engagement between the male connector 31 and the female connector 32, that is, in the thickness direction of the battery.

The portion where the first terminal 11a and the second terminal 11b are overlapping and in contact with each other is coated with thermoplastic resin from outside, and it is thereby also possible to temporarily fix the first terminal 11a and the second terminal 11b while keeping both terminals in contact with each other. In this case, the thermoplastic resin used for coating for temporary fixing, that is, temporary fixing resin preferably has a melting point higher than the temperature of the battery element when the battery is operating normally and equal to or lower than the temperature at which the gas generating material sealed in the second chamber is acting. Thus, the electrical connection between the first terminal 11a and the second terminal 11b is maintained while the battery is operating normally. On the other hand, when the temperature of the battery increases due to abnormal heat generation, the temporary fixing resin is melted and the second chamber inflates by the gas discharged from the first chamber, and it is thereby possible to interrupt current between the first terminal 11a and the second terminal 11b.

The current interrupting mechanism is preferably activated for safety at an early stage, that is, at a stage at which the temperature of the battery is sufficiently lower than a thermal runaway temperature of the active material. For that purpose, the temporary fixing resin preferably has a melting point less than 200° C. In order to fill the second chamber with the gas, the melting point of the temporary fixing resin is preferably equal to or lower than the melting point of resin used as the sealing layer of the outer package. For example, when polypropylene resin is used as the sealing layer of the outer package, the melting point of the temporary fixing resin is equal to or lower than 160° C. which is the melting point of the polypropylene resin, preferably 150° C. or lower or more preferably 140° C. or lower. When ethylene resin is used as the sealing layer of the outer package, the melting point of the temporary fixing resin is equal to or lower than 120° C. which is the melting point of ethylene resin, preferably 110° C. or lower or more preferably 100° C. or lower.

On the other hand, when safety of the battery is taken into consideration, it is not desirable that the temporary fixing resin be melted at a stage at which no abnormality has occurred yet. Therefore, the melting point of the temporary fixing resin is preferably 50° C. or higher, more preferably 70° C. or higher or further preferably 80° C. or higher.

As described above, the temporary fixing resin can be selected from among resin having an appropriate melting point according to the type of resin used as the sealing layer of the outer package or temperature at which the current interrupting mechanism is activated.

FIG. 11 illustrate specific examples of the outer package 14 configured such that the second chamber expands in the terminal direction. Hereinafter, the outer package 14 that expands in the direction in which the first terminal and the second terminal are led out will be described with reference to FIG. 11 or the like. In the following description, when referring to the direction of the outer package, the direction perpendicular to the "terminal direction" and the thickness direction of the battery is referred to as a "width direction."

In the example shown in FIG. 11, the outer package includes a pair of main sheets 131 disposed so as to face each other and sandwich an inner package enclosing a battery element (not shown in FIG. 11) from above and below and a pair of side sheets 132 disposed between the pair of main sheets 131 at one end portion in the longitudinal direction thereof. The pair of main sheets 131 and the pair of side sheets 132 are formed such that only one face is weldable, and the pair of main sheets 131 are disposed such that weldable faces face each other. The pair of side sheets 132 are disposed such that they are folded in half with the weldable face facing outward, the folds are placed so as to face each other, and disposed at both ends of the main sheets 131 in the width direction between the main sheets 131.

The main sheets 131 and the side sheets 132 disposed as described above are welded at a region along the whole perimeter of the outer edge of the main sheets 131 and an outer peripheral portion of the folded portion of the side sheets 132. With the side sheets 132 disposed, the side sheets 132 constitute side walls of the second chamber. The main sheets 131 in the part of the second chamber are mountain-folded along the width direction of the main sheets 131 so that a mountain portion 133 is formed on the surface side and the back of the outer package 14. In this way, the length in the terminal direction of the second chamber becomes smaller at the end portion of the second chamber. By causing a gas to be generated in the second chamber in this condition, it is possible to expand the end portion of the second chamber in the terminal direction.

Figure 12A:
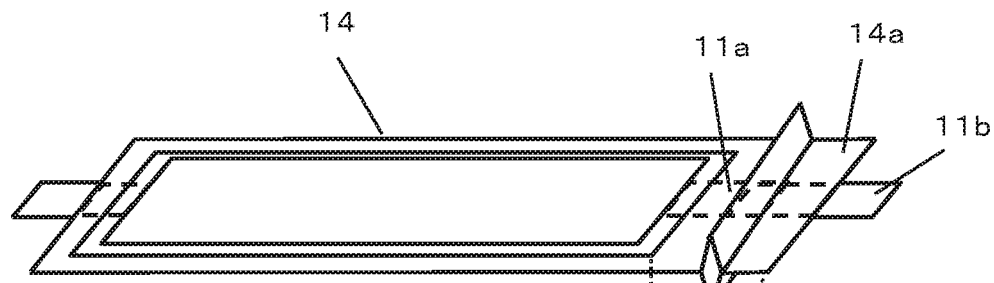
FIGS. 12A and 12B are diagrams illustrating a current interrupting operation of the battery using the package shown in FIG. 11.
Figure 12B:
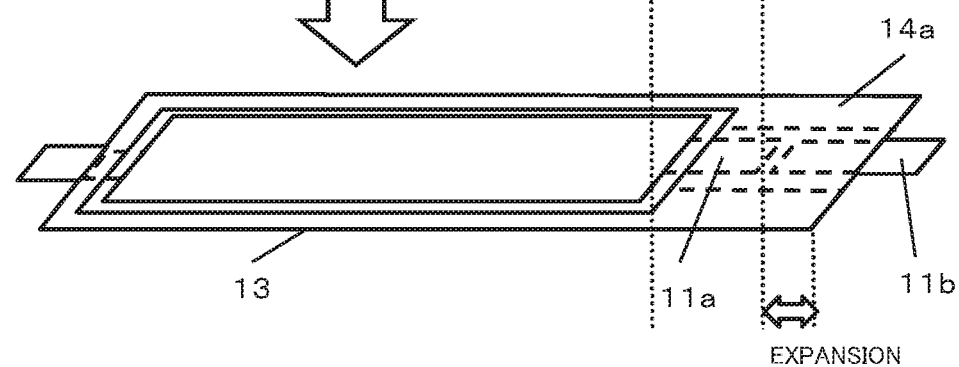

FIG. 12 illustrate an example of the battery to which the outer package shown in FIG. 11 is applied. When the outer package 14 shown in FIG. 11 is applied as the outer package of the battery, the second terminal 11b is determined a position relationship with the first terminal 11a and fixed to the outer package 14 so that the second terminal 11b is in contact with the first terminal 11a before the second chamber 14a expands, whereas when the second chamber 14a expands, the second terminal 12 separates from the first terminal 11. The aforementioned gas generating material is sealed in the first chamber.

Figure 13A:
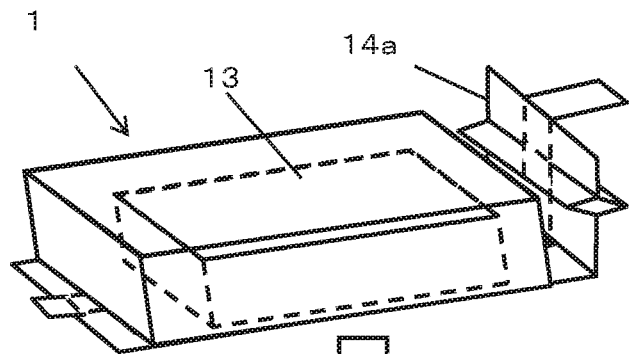
FIGS. 13A and 13B are diagrams showing a current interrupting operation when the second chamber is folded toward the first chamber in the battery shown in FIG. 12.
Figure 13B:
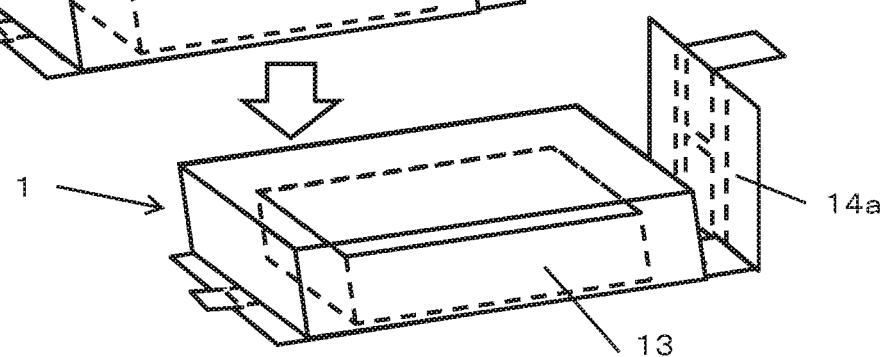

By folding the outer package 14 to enable the second chamber 14a to expand in the terminal direction as in the present embodiment, it is possible to reliably interrupt the electrical connection between the first terminal 11a and the second terminal 11b as the second chamber 14a inflates and the possibility that both terminals will come into contact with each other over again after the interruption is extremely low. As a result, it is possible to further improve the safety of the battery. Furthermore, by folding the expanding portion of the second chamber 14a, the expansion direction of the second chamber 14a can be changed optionally. For example, as shown in FIG. 13, if the expanding portion of the second chamber 14a is folded toward the inner package 13, it is possible to reduce the increment of the space occupied of the battery 1 by the expansion of the second chamber 14a. Especially when the folding angle is 90 degrees, the second chamber 14a can be made to expand in the thickness direction of the battery 1. In the actual battery, there are many laminated electrodes and the thickness of the battery element is large. Therefore, if the expanding portion of the second chamber 14a is folded in the thickness direction of the battery 1, even when the second chamber 14a expands, there is substantially no increase in the space occupied by the battery 1, and it is possible to provide a safe battery system (battery pack) which can be installed with a minimum installation space.

FIGS. 11 to 13 have illustrated examples where one mountain portion 133 is formed in the second chamber 14a. However, a bellows structure may also be adopted in which a plurality of mountain portions 133 are arrayed in the terminal direction. By forming the plurality of mountain portions 133 in the second chamber 14a, it is possible to reduce the height of the mountain portion 133 and obtain a large amount of expansion. The ability to reduce the height of the mountain portion 133 corresponds to the ability to reduce the thickness of the second chamber 14a in a folded state and is therefore preferable. The method of folding the outer package 14 to cause the second chamber 14a to expand in the terminal direction is not limited to the methods shown in FIGS. 11 to 13. For example, by applying the method disclosed in aforementioned Patent Literature 3, it is possible to adopt a structure in which the outer package 14 is folded toward the terminal direction at the portion of the second chamber 14a. The number of folding locations may be one or plural in this case, too.

In each of the embodiments described above, only one of the pair of terminals connected to the battery element 10 has the first terminal and the second terminal, but the other terminal may also be configured to have the first terminal and the second terminal arranges to be able to interrupt the electrical connection and the second chamber inflates so that the electrical connection between the first terminal and the second terminal is interrupted in a portion with the terminals. In this case, it is more preferable to have a current interrupting mechanism on both the positive electrode side and the negative electrode side.

In the case where each of the pair of terminals connected to the battery element has the first terminal and the second terminal arranged so as to be able to interrupt the electrical connection, these terminals may be led out from the same side of the battery. According to such arrangement, current interrupting mechanisms can be provided on both the positive electrode and negative electrode in one second chamber, which is preferable from the viewpoint of safety improvement. Furthermore, since the number of the second chambers can be one, if the second chamber structure that expands in the terminal direction during inflation is adopted, the amount of increase of the space occupied by the battery after the second chamber has expanded can be less than in the case where two second chambers are provided. Thus, it is possible to provide a safe battery system (battery pack) which can be installed in a smaller installation space.

Here, the gas generating material enclosed in the first chamber 13a or the second chamber 14a will be described in detail.

(i) Compound Generating Gas at Predetermined Temperature or Higher

A volatile material can be used as a compound generating gas at a predetermined temperature or higher. Examples of a solid volatile material include an adsorbent that has adsorbed a gas. For example, use of silica gel or zeolite that has adsorbed moisture allows heat that transmits through a conductor to cause the adsorbent to discharge the gas such as moisture. Furthermore, a metal hydrate can also be used as the gas generating material. For example, aluminum hydroxide discharges moisture when heated. In such materials, the moisture is sifted to the electrolyte even in the operating temperature area of the battery, with the result that electrolysis takes place and the lithium ion battery is destroyed, and therefore it is preferable that these materials is enclosed in the second chamber 14a but the first chamber 13a. Therefore, enclosing these materials in the second chamber allows current to be interrupted when the temperature rises due to the occurrence of abnormality without affecting the characteristic of the battery.

A liquid can also be used as the gas generating material. If it is a nonaqueous liquid, it can be enclosed in the first chamber 13a or the second chamber 14a. A gas can be generated if at least one solvent that makes up the liquid is volatized. The current interrupting mechanism is preferably activated for safety at an early stage, that is, at a stage at which the temperature of the battery is sufficiently lower than a thermal runaway temperature of an active material, and for that purpose, the volatilization temperature of the solvent is preferably lower than 200° C. In order to fill the gas, the volatilization temperature of the solvent is preferably equal to or lower than the melting point of the resin used as the sealing layer of the outer package. For example, when polypropylene resin is used as the sealing layer of the outer package, the volatilization temperature of the solvent is equal to or lower than 160° C. which is the melting point of polypropylene resin, preferably 150° C. or lower or more preferably 140° C. or lower. When ethylene resin is used as the sealing layer of the outer package, the volatilization temperature of the solvent is equal to or lower than 120° C. which is the melting point of ethylene resin, preferably 110° C. or lower or more preferably 100° C. or lower.

On the other hand, when stability of the battery is taken into consideration, it is not desirable that the solvent be volatized at a stage at which no abnormality has occurred. Therefore, the volatilization temperature of the solvent is preferably 50° C. or higher, more preferably 70° C. or higher and further preferably 80° C. or higher.

Water can be used as the solvent in in the case of enclosing in the second chamber 14a. Among the water, pure water is particularly preferable. Pure water prevents any gas from being generated as a result of electrolysis even when the terminals of the positive electrode side and the negative electrode side exist in the second chamber 14a.

A nonaqueous solvent, for example, an electrolyte component, which will be described later, may be used as the solvent. Using the electrolyte component, even if the sealing portion of the first chamber 13a is damaged and the liquid leaks from the second chamber 14a to the first chamber 13a, the first chamber 13a can be kept in a nonaqueous condition. Furthermore, if the liquid in the second chamber 14a has the same composition as that of the electrolyte in the first chamber 13a, the function of the battery can be maintained even if the liquid in the second chamber 14a leaks into the first chamber 13a.

Examples of such a nonaqueous solvent include, for example, diethyl carbonate, dimethyl carbonate, methylethyl carbonate. The gas for causing the current interrupting mechanism to operate is preferably a nonflammable or flame retardant gas, and so a gas containing fluorine or phosphor atoms is preferable. Examples of such a gas include fluorinated esters such as methyl fluoroethyl carbonate, fluorinated carbonates, fluorinated ether such as tetrafluoroethyltetrafluoropropylether, decafluoropropylether, octafluoropentyltetrafluoroethylether or phosphonate esters.

(ii) Compound Generating Gas at Predetermined Voltage or Higher

As a material which generates gas at a predetermined voltage or higher, a type which generates gas among overcharge inhibitor can be used. For example, the compound includes cyclohexylbenzene, biphenyl, phenyl-tertiary butyl carbonate, pyrocarbonate and the like.

(iii) Compound Generating Heat at Predetermined Voltage or Higher

As a material which generates heat a predetermined voltage or higher, one having redox reaction potential suitable for the specification of the battery can be selected among the redox shuttle agent.

As a redox shuttle agent, it can be used a compound which can be uniformly dissolved or dispersed in a non-aqueous electrolyte and has an oxidation potential higher than the maximum potential (of SOC 100%) normally used for a positive electrode active material. However, it is preferable to select the redox shuttle agent appropriately according to the maximum potential used for the positive electrode active material. The oxidation potential of the redox shuttle agent is preferably 0.1 to 2 V higher than the maximum potential of the positive electrode, more preferably 0.2 to 1 V higher. When the oxidation potential of the redox shuttle agent is within the above range, it is possible to suppress the reaction of the redox shuttle agent when the secondary battery is operated at a normal voltage, and in the case of abnormality such as overcharge, the redox shuttle agent can reacts immediately to stop the operation of the secondary battery.

Types of compounds that can be used as the redox shuttle agent include aromatic compounds, heterocyclic complexes, metallocene complexes such as ferrocene, Ce compounds, radical compounds and the like. In addition, only one kind of redox shuttle agent can be used alone, or two or more kinds thereof can be used in combination.

Specific examples of the compounds include, for example, heterocyclic compounds having one or more electron-withdrawing or electron-donating substituents such as 3,4-difluoroanisole, 2,4-difluoroanisole, 2,4-difluoroanisole, 1-methoxy-2,3,4,5,6-pentafluorobenzene, 2,3,5,6-tetrafluoroanisole, 4-(trifluoromethoxy) anisole, 3,4-dimethoxybenzonitrile, 1,2,3,4-tetrachloro-5,6-dimethoxybenzene, 1,2,4, 5-tetrachloro-3,6-dimethoxybenzene 4-fluoro-1,2-dimethoxybenzene, 4-bromo-1,2-dimethoxybenzene, 2-bromo-1,4-dimethylbenzene, 1-bromo-3-fluoro-4-methoxybenzene, 2-bromo-1,3-difluoro-5-methoxybenzene, 4,5-difluoro-1,2-dimethoxybenzene, 2,5-difluoro-1,4-dimethoxybenzene, 1,2,3,4-tetrachloro-5,5-dimethoxycyclopentadiene, 1,2,4 trimethoxybenzene, 1,2,3-trimethoxybenzene, 2,5-di-tert-butyl-1,4-dimethoxybenzene, 4-tert-butyl-1,2-dimethoxybenzene, 1,4-ditetrabutyl-2,5-trifluoromethoxybenzene, 1,2-ditetrabutyl-4,5-trifluoromethoxybenzene; heterocyclic compounds such as 4-chloro-1,2-methylenedioxybenzene, 4-bromo-1,2-methylenedioxybenzene, 3,4-methylenedioxybenzonitrile, 4-nitro-1,2-methylenedioxybenzene, 2-chloro-5-methoxypyrazine; radical compound such as nitroxyl radical compound; cerium compounds such as cerium nitrate; metallocene complexes such as ferrocene complexes can be used alone or in combination of two or more.

The redox shuttle agent is a compound that can be uniformly dissolved or dispersed in the nonaqueous electrolyte and can be appropriately selected according to the required maximum potential of the positive electrode. Each of these compounds has a reaction potential corresponding to each compound, and when it is higher than the reaction potential, the oxidation reaction rate greatly increases. For example, 2,5-di-tert-butyl-1,4-dimethoxybenzene has a reaction potential of about 3.9 V and 4-bromo-1,2-dimethoxybenzene has a reaction potential of about 4.3 V.

When the battery is charged at a constant current, if the voltage between the positive and negative electrodes of the battery becomes high voltage and the redox shuttle agent in the electrolytic solution is exposed to a potential higher than the reaction potential, the redox shuttle agent reacts and repeat the oxidation-reduction reaction with the negative electrode. With the heat generated by the repetition of the oxidation-reduction reaction, the temperature inside the first chamber 13a or the second chamber 14a rises.

In addition, since aromatic compounds having one or more alkoxy groups (methoxybenzenes and dimethoxybenzenes) have excellent chemical stability of the oxidant produced by the oxidation reaction, deterioration of the battery performance due to side reactions and the like can be suppressed. In addition, since a compound including a halogen atom has high redox potential, it can be applied to a positive electrode having a higher redox reaction potential, that is, a secondary battery having a higher energy density.

In case that the gas generating material is enclosed in the first chamber 13a, a desiccant may be enclosed in the second chamber 14a, whereby the effect of preventing moisture from invading from the outside of the battery to the first chamber 13a having the battery element 10 can be obtained. This makes it possible to improve the reliability of the lithium ion battery. Moreover, if a liquid leakage sensor and an indicator are enclosed in the outer package 14 and the outer package 14 is made of a transparent film, it is possible to visually confirm a leakage of the electrolyte from the inner package 13 before the electrolyte leaks outside of the battery even if the electrolyte leaks out from the inner package 13. Furthermore, if an oil solidifying material is enclosed in the outer package 14, it is possible to solidify the leaked electrolyte. In addition, an extinguishing agent can be enclosed in outer package 14. In this case, it is possible to protect the battery, for example, when the battery is in a fire.

(Inner Package/Outer Package)

The inner package 13 and the outer package 14 can be configured using any given flexible member being stable for electrolyte and having sufficient vapor barrier property. As such a member, a laminated film having a welding layer may be preferably used. Examples of the laminated film include polypropylene film and polyethylene film coated with aluminum, silica, alumina. An aluminum laminated film is particularly preferable from the viewpoint of suppressing volume expansion due to expansion of the film itself.

The inner package 13 and the outer package 14 may be constituted by the same member or different members. For example, when the inner package 13 is an aluminum laminate film and the outer package 14 is a film not using aluminum laminate, the battery can be observed from the outside, so leakage observation, confirmation of the indicator and the like as described above will be possible.

Inner package is not necessary to inflate in order to discharge gas from the first chamber 13a to the second chamber 14a even if the gas generating material is enclosed in the first chamber 13a. Therefore, the inner package 13 need not have flexibility, and may be formed of a can body.

Examples of a typical layer configuration of the laminated film include a configuration in which a metal thin-film layer and a heat-fusible resin layer are laminated together. Another example of a typical layer configuration of the laminated film is a configuration in which a protective layer made up of a film of polyester such as polyethylene terephthalate or nylon is laminated on the surface opposite to a heat weldable resin layer of the metal thin-film layer. When the battery element is enclosed, the battery element is enclosed by the laminated film with the heat-fusible resin layers placed facing each other. As the metal thin-film layer, a foil of Al, Ti, a Ti alloy, Fe, stainless steel, an Mg alloy or the like having a thickness of, for example, 10 to 100 μm is used. The resin used for the heat weldable resin layer is not particularly limited as long as it is heat weldable resin. As the heat weldable resin, for example, polypropylene, polyethylene, acid modified products thereof, polyphenylene sulfide, polyester such as polyethylene terephthalate, polyamide, ethylene-vinyl acetate copolymer, ionomer resin in which ethylene-methacrylic acid copolymer or ethylene-acrylic acid copolymer is intermolecularly joined by metal ion can be used. The heat weldable resin layer preferably has a thickness of 10 to 200 μm or more preferably 30 to 100 μm.

Figure 14A:
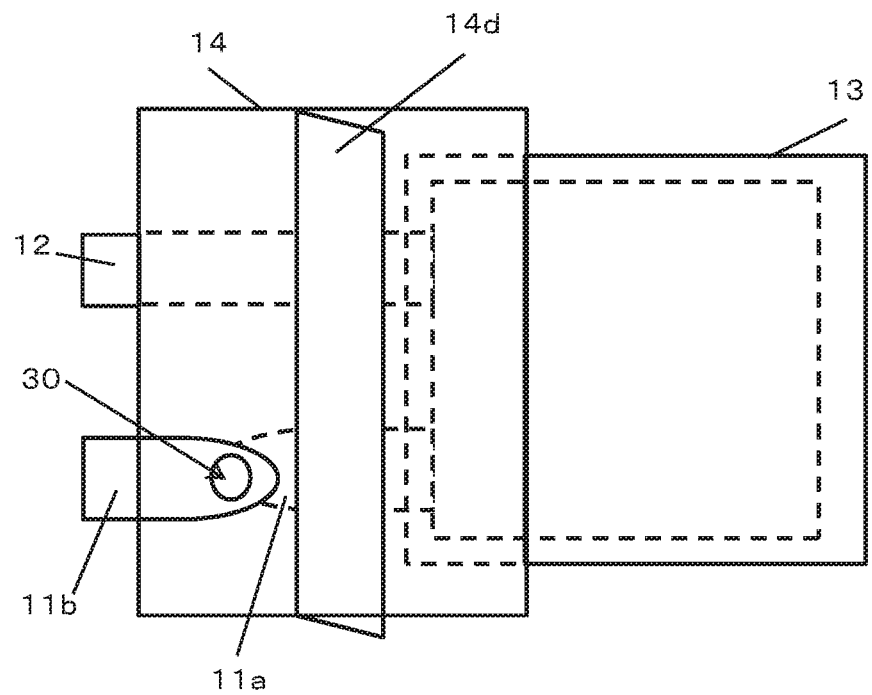
FIG. 14A is a plan view schematically illustrating a structure of a battery according to other embodiment of the present invention.
Figure 14B:
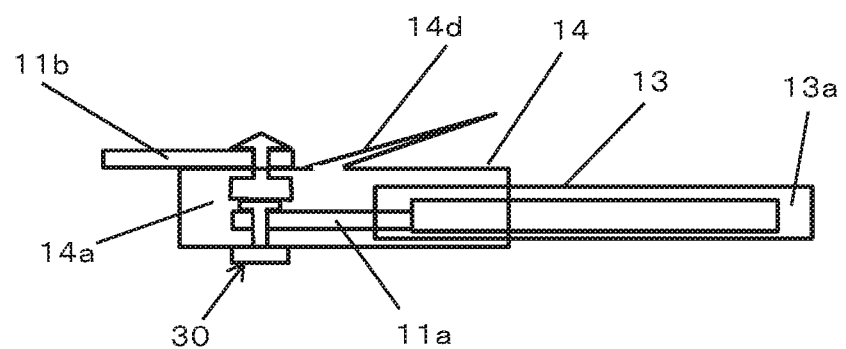
FIG. 14B is a side view schematically illustrating the structure of the battery shown in FIG. 14A.

The embodiment shown in FIGS. 14A and 14B shows an embodiment includes a snap 30 for temporarily fixing the first terminal 11a and the second terminal 11b to each other and an outer package having an inflatable portion 14d as shown in FIGS. 10A to 10D as an example of a configuration for interrupting the current at the time of occurrence of abnormality. However, any of the configurations described above may be adopted as this configuration. Even such configuration in which only a part of the inner package 13 is covered with the outer package 14, since this configuration acts in the same way as in case the entire inner package 13 is surrounded by the outer package 14, the same effect is exerted.

In case that the outer package 14 is configured to cover a part of the inner package 13, the outer package 14 is joined to the inner package 13 at a portion overlapping the inner package 13 at the outer circumferential edge thereof. In many cases, the inner surface of the laminate film is made of a thermal welding material and the outer surface is made of a non-thermal welding material. Therefore, if the inner package 13 and the outer package 14 are formed of a laminate film, it is difficult to join the outer package 14 to the outer package 13 by thermal welding. Therefore, in the case of this embodiment, it is preferable to join the inner package 13 and the outer package 14 for forming the second chamber 14a with an adhesive.

The gas generating material may be enclosed in either the first chamber 13a or the second chamber 14a. If the gas generating material is enclosed in the first chamber 13a, in order to discharge the gas generated in the first chamber 13a from a specific portion of the first chamber 13a into the second chamber 14a, the inner package 13 is provided with a pressure releasing mechanism such as a pressure valve or a weak sealed portion which opens when a pressure equal to or higher than a predetermined pressure is applied. The region of the inner package 13 covered by the outer package 14 is a region including a portion where the pressure releasing mechanism is provided.

In case where a laminate film is used as the inner package 13 and another member such as a pressure valve is attached or a weak sealed portion is formed by welding or the like to the laminate film, depending on such as welding conditions, the welding strength of the laminate film may become weaker around these portions than the other portions. In this way, it is the pressure releasing mechanism and its surroundings that gas is most likely to be discharged when the internal pressure of the first chamber 13a rises. Therefore, a region covering the inner package 13 with the outer package 14 is sufficient as long as it is an area including at least that portion, thereby making it possible to reduce the size of the outer package 14 while effectively preventing gas leakage from the battery can be prevented. Reducing the size of the outer package 14 leads to a reduction in the amount of use of the outer package 14, which in turn leads to cost reduction of the battery.

(Battery Element)

Next, the configuration of the battery element will be described briefly. Although the configuration of the battery element is not particularly limited, for example, a lamination type configuration which incorporates an electrode element with a positive electrode and a negative electrode arranged so as to face each other, and an electrolyte may be adopted.

Figure 15:
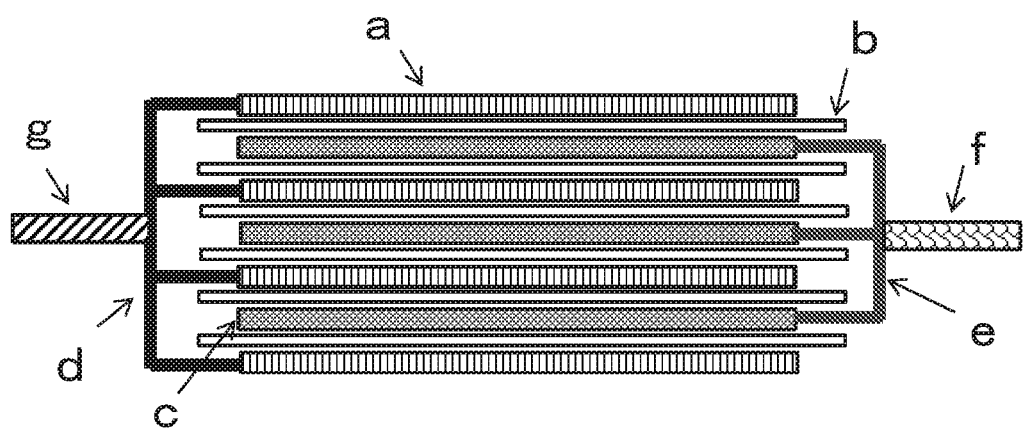
FIG. 15 is a schematic view showing an example of a configuration of a battery element used in the present invention.

FIG. 15 is a schematic cross-sectional view illustrating a structure of an electrode element included in a laminated secondary battery. This electrode element is formed of a plurality of positive electrodes c having a planar structure and a plurality of negative electrodes a having a planar structure alternately piled one atop another with a separator b interposed therebetween. Positive electrode current collectors e provided for the respective positive electrodes c are welded and electrically connected to each other at an end portion not covered with a positive electrode active material and further, a positive electrode terminal f is welded at the welded location thereof. Negative electrode current collectors d provided for the respective negative electrodes a are welded and electrically connected to each other at an end portion not covered with a negative electrode active material and further, a negative electrode terminal g is welded at the welded location thereof. The positive electrode terminal f and the negative electrode terminal g may be one of the aforementioned pair of terminals 11,12 shown in FIG. 1A or a pair of terminals 11, 12 may be connected to each of the positive terminal f and the negative terminal g.

The electrode element having such a planar laminated structure has a large battery surface area, and can thereby efficiently release heat generated in the event of abnormality. In contrast, in the case of a winding type structure, heat generated at the center is accumulated without being released. Since the electrode element having a laminated structure has no portion with a small R (region close to a winding core in the winding structure), it has an advantage of being less susceptible to adverse influence on a volume change of the electrode accompanying charge/discharge compared to the electrode element having the winding structure. That is, the electrode element having the laminated structure is effective as the electrode element using an active material which is likely to cause volume inflation. On the other hand, since the electrode element having the winding structure has bent electrodes, when a volume change occurs, the structure is likely to be distorted. When a negative electrode active material such as silicon oxide which has a large volume change accompanying charge/discharge is used, a secondary battery using the electrode element having the winding structure has a large capacity drop accompanying charge/discharge.

Although not particularly limited, the battery element of the present invention is preferably a battery element of a lithium ion secondary battery. Hereinafter, preferable materials for the battery element will be described.

[1] Negative Electrode

The negative electrode has a structure in which, for example, a negative electrode active material is bound to a negative electrode current collector using a negative electrode binder, and a negative electrode active material is laminated on the negative electrode current collector as a negative electrode active material layer. As the negative electrode active material in the present embodiment, any material can be used as long as it can absorb and desorb lithium ion unless the effects of the present invention are impaired significantly. Normally, just as in the case of the positive electrode, the negative electrode used is also configured by providing a negative electrode active material layer on the current collector. Note that just as the positive electrode, the negative electrode may also be provided with other layers as appropriate.

The negative electrode active material has no other limitations as long as it is a material capable of absorbing and desorbing lithium ions and any publicly known negative electrode active materials can be used optionally. For example, carbonaceous material such as coke, acetylene black, mesophase microbeads, graphite; lithium metal; lithium alloy such as lithium-silicon, lithium-tin, and lithium titanate may be preferably used. Among them, the negative electrode active material using the carbonaceous material is most preferable in that it has a cyclic characteristic, an excellent safety and an excellent continuous charge characteristic. Note that one kind of negative electrode active material may be used singly or a mixture of two or more kinds of negative electrode active materials may be used in an optional combination and at an optional ratio.

Furthermore, the particle size of the negative electrode active material may be optional as long as it does not significantly impair the effects of the present invention, but it is normally on the order of 1 μm or greater, preferably 15 μm, normally 50 μm or less or preferably 30 μm or less from the viewpoint that it has excellent battery characteristics such as initial efficiency, rate characteristic and cycle characteristic. Furthermore, a carbonaceous material obtained by coating the above-described carbonaceous material with organic matter such as pitch and then sintering the coated carbonaceous material or a carbonaceous material, on a surface of which more amorphous carbon than the carbonaceous material is formed using a CVD method or the like can also be suitably used as the carbonaceous material. Here, examples of the organic matter used for coating include coal tar pitch from soft pitch to hard pitch; carboniferous heavy oil such as dry distillation liquefied oil; straight heavy oil such as atmospheric residue, vacuum residue; petroleum-based heavy oil such as decomposable heavy oil (e.g., ethylene heavy end) produced as byproduct during thermal decompression of crude oil or naphtha or the like. Theses heavy oils may be distilled at 200 to 400° C. and a solid residue thereby obtained may be crushed into 1 to 100 µm and used. Moreover, vinyl chloride resin, phenol resin, imide resin or the like may also be used In one embodiment of the present invention, the negative electrode includes a metal and/or a metal oxide and carbon as a negative electrode active material. As the metal Li, Al, Si, Pb, Sn, In, Bi, Ag, Ba, Ca, Hg, Pd, Pt, Te, Zn, La, or an alloy containing two or more of these may be exemplified. Alternatively, it may be used by mixing two or more of these metals and alloys. These metals and alloys may comprise one or more non-metal elements.

Examples of the metal oxide include silicon oxide, aluminum oxide, tin oxide, indium oxide, zinc oxide, lithium oxide, or a composite thereof. In the present embodiment, it is preferable to include tin oxide or silicon oxide as the negative electrode active material, and more preferably silicon oxide. This is because silicon oxide is relatively stable and hardly causes reaction with other compounds. Further, it is also possible to add, for example, 0.1 to 5 mass % of one or more elements selected from nitrogen, boron and sulfur to the metal oxide. Thereby, the electrical conductivity of the metal oxide can be improved. Also, by covering the metal or the metal oxide with a conductive material such as carbon by vapor deposition or the like, electric conductivity can be similarly improved.

Examples of the carbon include graphite, amorphous carbon, diamond-like carbon, carbon nanotube, or a composite thereof. Highly crystalline graphite has high electrical conductivity and is excellent in adhesion to a negative electrode current collector made of a metal such as copper and voltage flatness. On the other hand, since amorphous carbon having low crystallinity has a relatively small volume expansion, it has a high effect of relaxing the volume expansion of the entire negative electrode, and deterioration due to nonuniformity such as crystal grain boundaries and defects hardly occurs.

The metal and the metal oxide are characterized by a far greater lithium accepting capacity than carbon. Therefore, by using a large amount of the metal and the metal oxide as the negative electrode active material, the energy density of the battery can be improved. In order to attain a high energy density, it is preferable that the content ratio of the metal and/or the metal oxide in the negative electrode active material is high, and the metal and/or the metal oxide are compounded in the negative electrode such that the lithium acceptable amount of the carbon contained in the negative electrode is larger than the lithium releasable amount of the positive electrode. In this specification, the lithium releasable amount of the positive electrode and the lithium acceptable amount of the carbon contained in the negative electrode refer to the respective theoretical capacities. The ratio of the lithium acceptable amount of carbon contained in the negative electrode with respect to the lithium releasable amount of the positive electrode is preferably 0.95 or less, more preferably 0.9 or less, and still more preferably 0.8 or less. As the amount of the metal and/or the metal oxide increases, the capacity of the negative electrode as a whole increases, it is preferable that the amount of the metal and/or the metal oxide is large. The metal and/or the metal oxide is preferably contained in the negative electrode in an amount of 0.01 mass % or more of the negative electrode active material, more preferably 0.1 mass % or more, and further preferably 1 mass % or more. However, the metal and/or the metal oxide has a volume change upon absorption and desorption of lithium as compared with carbon, and electrical junction may be lost. Therefore, the preferable amount of the metal and/or the metal oxide is 99 mass % or less, more preferably 90 mass % or less, further preferably 80 mass % or less. As described above, the negative electrode active material is a material capable of reversibly absorbing and desorbing lithium ions with charge and discharge in the negative electrode, and does not include other binders and the like.

For example, the negative electrode active material layer can be formed into a sheet electrode by roll-forming or a pellet electrode by compression molding the above-described negative electrode active material, but usually, the negative electrode active material layer can be manufactured by applying a coating liquid obtained by slurrying the above-described negative electrode active material, a binder and, if necessary, various kind of auxiliary agent with a solvent to the current collector and drying the coating liquid as in the case of the positive electrode active material layer.

As the negative electrode binder, although not particularly limited, for example, polyvinylidene fluoride, vinylidene fluoride-hexafluoropropylene copolymer, vinylidene fluoride-tetrafluoroethylene copolymer, styrene-butadiene copolymerized rubber, polytetrafluoroethylene, polypropylene, polyethylene, acrylic, polyimide, polyamide imide may be used. In addition to the above, styrene butadiene rubber (SBR) and the like can be used. When an aqueous binder such as an SBR emulsion is used, a thickener such as carboxymethyl cellulose (CMC) can also be used. The amount of the negative electrode binder to be used is preferably 0.5 to 20 parts by mass with respect to 100 parts by mass of the negative electrode active material from the viewpoint of "sufficient binding force" and "high energization" which are in a trade-off relationship.

As a material of the negative electrode current collector, a publicly known current collector may be used optionally, and, for example, a metallic material such as copper, nickel, stainless steel, aluminum, chromium, silver and an alloy thereof may be used preferably. Among them, copper is particularly preferable from the viewpoint of ease of work and cost. The negative electrode current collector may be preferably subjected to roughening treatment in advance. The shape of the current collector is also optional and examples of the shape include foil shape, planar shape, mesh shape and the like. A perforated current collector such as expand metal or punching metal may also be used.

As a method for manufacturing the negative electrode, for example, a negative electrode active material layer including a negative electrode active material and a negative electrode binder may be formed on the negative electrode current collector to manufacture the negative electrode. Examples of the method for manufacturing the negative electrode active material layer include a doctor blade method, a die coater method, a CVD method, a sputtering method. The negative electrode current collector may also be obtained by forming the negative electrode active material layer in advance and then forming a thin film of aluminum, nickel or an alloy thereof on the negative electrode active material layer using a method such as vapor deposition, sputtering.

For the coating layer containing the negative electrode active material, a conductive auxiliary material may be added for the purpose of lowering the impedance. Examples of the conductive auxiliary material, include scale-like, soot-like or fibrous carbonaceous fine particle such as graphite, carbon black, acetylene black, vapor grown carbon fiber (VGCF (registered trademark) manufactured by Showa Denko K.K.) and the like.

[2] Positive Electrode

The positive electrode refers to an electrode having high potential in the battery. As an example, the positive electrode includes a positive electrode active material capable of reversibly absorbing and desorbing lithium ion with charge and discharge, and has a structure in which the positive electrode active material is laminated as a positive electrode active material layer integrated by a binder on a current collector. In one embodiment of the present invention, the positive electrode has a charge capacity per unit area of 3 mAh/cm$^2$ or more, preferably 3.5 mAh/cm$^2$ or more. From the viewpoint of safety and the like, the charge capacity per unit area of the positive electrode is preferably 15 mAh/cm$^2$ or less. Here, the charge capacity per unit area is calculated from the theoretical capacity of the active material. That is, the charge capacity of the positive electrode per unit area is calculated by (theoretical capacity of the positive electrode active material used for the positive electrode)/(area of the positive electrode). Note that the area of the positive electrode refers to the area of one surface, not both surfaces of the positive electrode.

The positive electrode active material in the present embodiment is not particularly limited if it is a material capable of absorbing and desorbing lithium and can be selected from several viewpoints. From the viewpoint of a high energy density, high-capacity compound may be preferably contained. Examples of the high-capacity compound include lithium-nickel composite oxide in which part of Ni of lithium nickelate (LiNiO$_2$) substituted by another metal element, and a layered lithium-nickel composite oxide represented by the following formula (A) are preferred.

$$Li_y Ni_{(1-x)} M_x O_2 \quad (A)$$

(where, 0≤x<1, 0<y≤1.2, M is at least one kind of element selected from a group composed of Co, Al, Mn, Fe, Ti and B).

From the viewpoint of high capacity, the content of Ni is preferably high, that is, in formula (A), x is preferably 0.5 or less, more preferably 0.4 or less. Examples of such a compound include Li$_\alpha$Ni$_\beta$Co$_\gamma$Mn$_\delta$O$_2$ (0<α≤1.2, preferably 1≤α≤1.2, β+γ+δ=1, β≥0.7, γ≤0.2), Li$_\alpha$Ni$_\beta$Co$_\gamma$Al$_\delta$O$_2$ (0<α≤1.2, preferably 1≤α≤1.2, β+γ+δ=1, β≥0.6, preferably β≥0.7, γ≤0.2) and particularly LiNi$_\beta$Co$_\gamma$Mn$_\delta$O$_2$ (0.75≤β≤0.85, 0.05≤γ≤0.15, 0.10≤δ≤0.20). More specifically, for example, LiNi$_{0.8}$Co$_{0.05}$Mn$_{0.15}$O$_2$, LiNi$_{0.8}$Co$_{0.1}$Mn$_{0.1}$O$_2$, LiNi$_{0.8}$Co$_{0.15}$Al$_{0.05}$O$_2$, LiNi$_{0.8}$Co$_{0.1}$Al$_{0.1}$O$_2$ can be preferably used.

On the other hand, from the viewpoint of thermal stability, the content of Ni preferably does not exceed 0.5, that is, x is preferably 0.5 or greater in formula (A). Moreover, no specific transition metal preferably exceeds half of proportion. Examples of such a compound include Li$_\alpha$Ni$_\beta$Co$_\gamma$Mn$_\delta$O$_2$ (0<α≤1.2, preferably 1≤α≤1.2, β+γ+δ=1, 0.2≤β≤0.5, 0.1≤γ≤0.4, 0.1≤δ≤0.4). More specifically, examples include LiNi$_{0.4}$Co$_{0.3}$Mn$_{0.3}$O$_2$ (abbreviated as NCM433), LiNi$_{1/3}$Co$_{1/3}$Mn$_{1/3}$O$_2$, LiNi$_{0.5}$Co$_{0.2}$Mn$_{0.3}$O$_2$ (abbreviated as NCM523), LiNi$_{0.5}$Co$_{0.3}$Mn$_{0.2}$O$_2$ (abbreviated as NCM532) (however, also including compounds in which the contents of the respective transition metals have fluctuated by the order of 10%).

A mixture of two or more kinds of the compounds expressed in formula (A) may be used and, for example, NCM532 or NCM523 may also be preferably used in a mixture with NCM433 at a ratio ranging from 9:1 to 1:9 (typical example is 2:1). Furthermore, in formula (A), by mixing a material having a high Ni content (x is 0.4 or less) and a material having a Ni content not exceeding 0.5 (x is 0.5 or greater, for example, NCM433), it is also possible to constitute a battery having a high capacity and excellent thermal stability.

In addition to the above-described materials, examples of the positive electrode active material include lithium manganate having a layered structure or a spinel structure such as LiMnO$_2$, Li$_x$Mn$_2$O$_4$ (0<x<2), Li$_2$MnO$_3$, Li$_x$Mn$_{1.5}$Ni$_{0.5}$O$_4$ (0<x<2); LiCoO$_2$ or part of these transition metals substituted by another metal; these lithium transition metal oxides whose Li is caused to exceed the stoichiometric composition; and a material having an olivine structure such as LiFePO$_4$. Furthermore, a material obtained by substituting some of these metal oxides by Al, Fe, P, Ti, Si, Pb, Sn, In, Bi, Ag, Ba, Ca, Hg, Pd, Pt, Te, Zn, La or the like may also be used. One kind of the above-described positive electrode active materials may be used singly or two or more kinds thereof may be used in combination.

As the positive electrode binder, a material similar to that for the negative electrode binder may be used. Among them, polyvinylidene fluoride or polytetrafluoroethylene is preferable from the viewpoint of general-purposeness and low cost, and polyvinylidene fluoride is more preferred. The amount of the positive electrode binder to be used is preferably 2 to 10 parts by mass with respect to 100 parts by mass of the positive electrode active material from the viewpoint of "sufficient binding force" and a "high energization" which are in a trade-off relationship.

For the coating layer containing the positive electrode active material, a conductive auxiliary material may be added for the purpose of lowering the impedance. Examples of the conductive auxiliary material, include scale-like, soot-like or fibrous carbonaceous fine particle such as graphite, carbon black, acetylene black, vapor grown carbon fiber (VGCF (registered trademark) manufactured by Showa Denko K.K.) and the like.

As the positive electrode current collector, a material similar to that for the negative electrode current collector may be used. In particular, as the positive electrode, a current collector using aluminum, an aluminum alloy, iron, nickel, chromium and molybdenum type stainless steel are preferable.

A conductive auxiliary material may be added to the positive electrode active material layer containing the positive electrode active material for the purpose of reducing impedance. Examples of the conductive auxiliary material include carbonaceous fine particles such as graphite, carbon black, acetylene black.

[3] Electrolyte

The electrolyte includes, but are not particularly limited, a nonaqueous electrolyte which is stable at an operating potential of the battery. Specific examples of the nonaqueous electrolyte include nonprotic organic solvent such as cyclic carbonates such as propylene carbonate (PC), ethylene carbonate (EC), fluoroethylene carbonate (FEC), t-difluoroethylene carbonate (t-DFEC), butylene carbonate (BC), vinylene carbonate (VC), vinylethylene carbonate (VEC); chain carbonates such as allylmethyl carbonate (AMC), dimethyl carbonate (DMC), diethyl carbonate (DEC), ethylmethyl carbonate (EMC), dipropyl carbonate (DPC); propylene carbonate derivative; aliphatic carboxylic acid esters such as methyl formate, methyl acetate, ethyl propionate; cyclic esters such as γ-butyrolactone (GBL). The nonaqueous electrolyte may be used singly or a mixture of two or more kinds may be used in combination. Furthermore, sulfur-containing cyclic compound such as sulfolane, fluorinated sulfolane, propane sultone or propene sultone may be used.

Specific examples of support salt contained in the electrolyte include, but are not particularly limited to, lithium salt such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, $LiN(CF_3SO_2)_2$. The support salt may be used singly or two or more kinds thereof may be used in combination.

[4] Separator

As the separator, although not particularly limited, porous film or non-woven fabric made of such as polypropylene, polyethylene, fluorine-based resin, polyamide, polyimide, polyester, polyphenylene sulfide, as well as an article in which inorganic substance such as silica, alumina, glass is joined to a base material made of the above material and an article singly processed from the above material as non-woven fabric cloth or cloth may be used. Furthermore, these materials may be laminated to be used as the separator.

The battery element of the present invention is not limited to the battery element of the above-described lithium ion secondary battery, but the present invention is also applicable to any battery. However, in many cases, heat dissipation is also the problem of higher capacity batteries, and so the present invention is preferably applied to higher capacity batteries, and higher capacity lithium ion secondary batteries in particular.

The battery 1 can be used as a battery pack. The battery pack may include at least one battery 1 and a holding member that holds the battery 1 from both sides in the thickness direction of the battery 1.

Hereinafter, embodiments of the battery pack will be described with reference to FIGS. 16 and 17.

Figure 16:
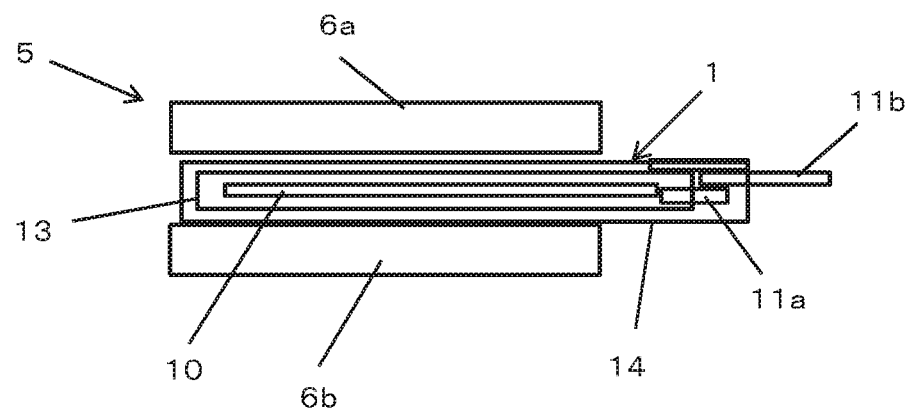
FIG. 16 is a schematic view showing one embodiment of a battery pack according to the present invention.

The battery pack 5 shown in FIG. 16 has one battery 1 and a pair of holding members 6a, 6b for holding the battery 1 from both sides in the thickness direction thereof. Any of the above-described embodiments may be used for the battery 1, and in the illustrated embodiment, a battery of the type described with reference to FIGS. 10A to 10D is shown. The holding members 6a and 6b are disposed at a position that does not constrain the inflation or extension portion of the outer package 14, for example, at a position facing at least a part of the battery element 10 and the inner package 13 via the outer package 14. The position at which the inflation or extension of the outer package 14 can be said to be a position which does not restrain the deformation of the outer package 14 so as to interrupt the electrical connection between the first terminal 11a and the second terminal 11b or a position other than a region where the first terminal 11a and the second terminal 11b are opposed to each other.

By holding the battery 1 with the holding members 6a and 6b, the inflation of the first chamber due to the gas generated in the first chamber is suppressed. This promotes the increase in the internal pressure of the first chamber due to the gas generated in the first chamber, and as a result, the gas is efficiently discharged from the first chamber to the second chamber. Furthermore, since the above-mentioned specific area of the outer package is also held by the holding members 6a, 6b, it is possible to efficiently inflate the second chamber in a region where the first terminal 11a and the second terminal 11b are opposed. As a result, the electrical connection between the first terminal 11a and the second terminal 11b can be efficiently interrupted.

Figure 17:
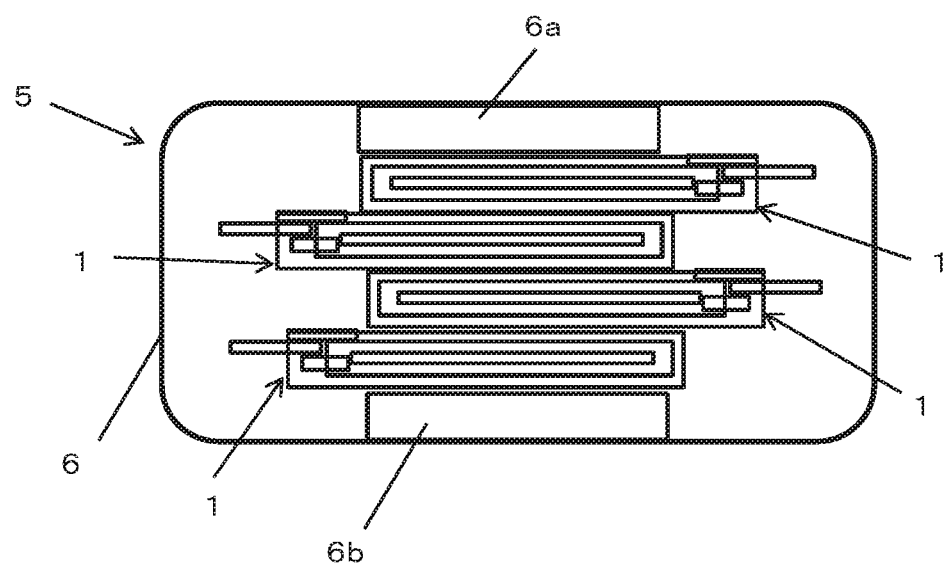
FIG. 17 is a schematic view showing other embodiment of a battery pack according to the present invention.

The battery pack 5 shown in FIG. 17 includes a plurality of batteries 1, a case 6 which houses the batteries 1, and a pair of holding members 6a and 6b which hold the batteries 1 in the case 6. A plurality of batteries 1 are stacked (laminated) and arranged in the thickness direction of the batteries 1, and the pair of holding members 6a and 6b arranged at positions facing each other on the inner surface of the case 6 hold the batteries 1 from both sides in the stacked direction (laminated direction) thereof. Therefore, the batteries 1 located in the middle in the stacked direction of the batteries 1 are held by the adjacent batteries 1. The holding members 6a and 6b may be a part of the case 6 or may be a separate member from the case 6.

Even when a plurality of batteries 1 are stacked, the concept of restraint of the battery 1 by the holding members 6a, 6b or the batteries 1 adjacent in the stacking direction is the same as the embodiment shown in FIG. 16. That is, the batteries 1 are stacked at a position which does not constrain the inflating or expanding portions of the outer package, and the holding members 6a, 6b are disposed at positions which do not constrain the inflating or expanding portions of the outer package. For this purpose, as shown in FIG. 17, it is preferable to stack a plurality of batteries 1 in positions and orientations such that the inflating or expanding portions are not adjacent to each other, for example, a plurality of batteries 1 are stacked such that the portions to be inflated or expanded of the outer package are opposed to each other between upper and lower adjacent batteries, and the outer package of the plurality of batteries 1

By stacking the plurality of batteries 1 as described above, similarly to the embodiment shown in FIG. 16, in the case of a structure generating gas in the first chamber, the gas can be efficiently discharged from the first chamber to the second chamber. In addition, in either of the structure for generating gas in the first chamber and the structure for generating gas in the second chamber, the electrical connection between the first terminal and the second terminal can be interrupted effectively.

Hereinafter, an embodiment and application example of the battery manufacturing method of the present invention will be described.

[Method for Manufacturing Battery]

In an embodiment of method for manufacturing a battery, first, a battery element 10 including a positive electrode and a negative electrode is enclosed in a first chamber 13a formed by an inner package 13. This step includes enclosing the battery elements 10 in the first chamber 13a in a state where the pair of first terminals 11a, 12 are led out from the inner package 13 after electrically connecting the pair of first terminals 11a, 12 to the positive electrode and the negative electrode respectively. Next, at least a portion of the inner package 13 is covered with the outer package 14 so as to form a second chamber 14a surrounding at least a portion of the first chamber 13a. This step includes covering at least a part of inner package 13 in a state that the second terminal 11b is arranged such that at least the one first terminal 11a of the pair of first terminals 11a, 12 is electrically connected within the second chamber 14a. If the outer package 14 covers only a part of the inner package 13, this step includes joining the outer package 14 to the inner package 13. The outer package 14 can be joined to the interior trim body 13 using an adhesive. Here, the step of enclosing the battery element 10 in the first chamber 13a or the step of enclosing the inner package 13 in the second chamber 14a include enclosing a gas generating material that generates gas at a temperature equal to or higher than a predetermined temperature of at a voltage equal to or higher than a predetermined voltage.

In the above manufacturing method, the step of covering at least a part of the inner package 13 with the outer package 14 can include bonding the first terminal 11a and the second terminal 11b to one surface and another surface of the opposing outer package 14 respectively in the second chamber 14a. In addition, the step of covering at least a part of the inner package 13 with the outer package 14 may include temporarily attaching the second terminal 11b to the first terminal 11a in a state of being electrically connected.

The temporary attaching between the first terminal 11a and the second terminal 11b may include, for example, sandwiching an overlapping portion of the first terminal 11a and the second terminal 11b with the clip 20, fixing a male connector 31 and a female connector 32 to one and another of the first terminal 11a and the second terminal 11b respectively with using a snap 30 having the male connector 31 and the female connector 32 which engage with each other, and coating a portion where the first terminal 11a and the second terminal 11b are in contact with each other with a thermoplastic resin from the outside.

[Battery Pack]

A plurality of batteries can be combined to form a battery pack. For example, the battery pack may have a configuration in which two or more batteries according to the present embodiment are connected in series and/or in parallel. The series number and parallel number of the batteries can be appropriately selected according to the intended voltage and capacity of the battery pack.

[Vehicle]

Figure 18:
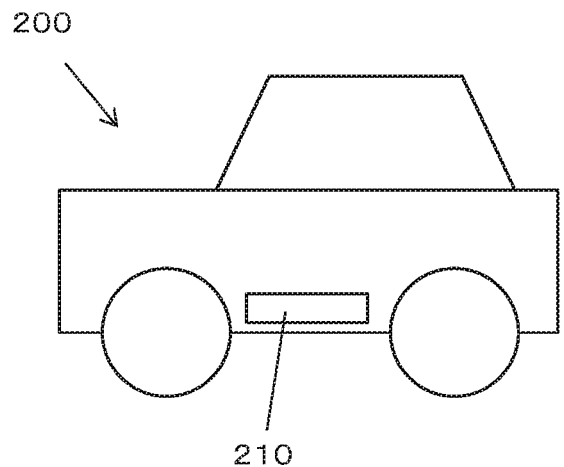
FIG. 18 is a schematic view illustrating an example of an electric automobile provided with the battery of the present invention.

The above-described battery or the battery pack thereof can be used for a vehicle. Examples of vehicles that can use batteries or battery packs include hybrid vehicles, fuel cell vehicles, and electric vehicles (including four-wheel vehicles (commercial vehicles such as passenger cars, trucks and buses, small vehicles, etc.), motorcycles (motorbikes) and tricycles). Note that the vehicle according to the present embodiment is not limited to an automobile. The battery or the battery pack may also be used as a power source for another vehicle, for example, a moving object such as a train. As an example of such a vehicle, FIG. 18 shows a schematic diagram of an electric vehicle. The electric vehicle 200 shown in FIG. 18 has a battery pack 210 configured to connect a plurality of the above-described batteries in series and in parallel, and to satisfy a required voltage and capacity.

[Power Storage Device]

Figure 19:
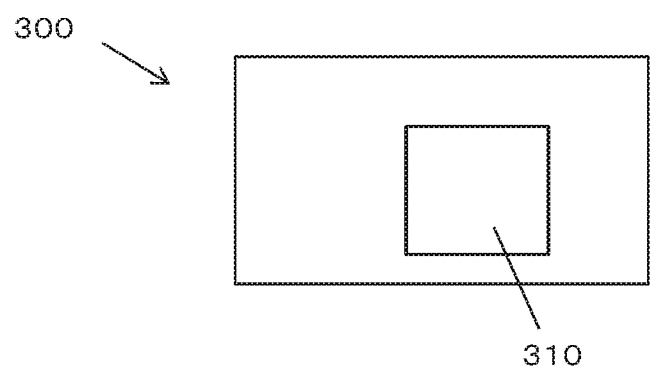
FIG. 19 is a schematic view illustrating an example of an electric storage facility provided with the battery of the present invention.

The above-described battery or the battery pack thereof can be used for a power storage device. A power storage device using a secondary battery or an battery pack include, for example, a power storage device used for a backup power source or an auxiliary power source during a power outage, which is connected between a commercial power supply supplied to a general household and a load such as a household electric appliance, and a power storage device used for large-scale power storage for stabilizing power output with large time variation due to renewable energy, such as photovoltaic power generation. An example of such a power storage device is schematically shown in FIG. 19. The power storage device 300 shown in FIG. 19 has a battery pack 310 configured to connect a plurality of the above-described batteries in series and in parallel and to satisfy a required voltage and capacity.

[Others]

Furthermore, the above-described battery or battery pack thereof can also be used as a power supply for mobile devices such as mobile phones and notebook computers.

Although the present invention has been described in detail with reference to various embodiments, the present specification discloses the following invention.

[1] A battery comprising:
a battery element 10 including a positive electrode and a negative electrode;

an inner package 13 forming a first chamber 13a for enclosing the battery element 10;

an outer package 14 covering at least a part of the inner package 13 so as to form a second chamber 14a surrounding at least a part of the first chamber 13a; and a pair of terminals 11, 12 electrically connected to the positive electrode and the negative electrode and led out to the outside of the outer package 14, wherein at least one terminal 11 of the pair of terminals 11, 12 has a first terminal 11a and a second terminal 11b arranged so as to be electrically connected in the second chamber 14a, and a gas generating material 15 is enclosed in the first chamber 13a or the second chamber 14a, the gas generating material 15 generates gas at a predetermined temperature or higher or a predetermined voltage or higher.

[2] The battery according to [1], wherein the battery element 10 includes an electrolyte containing the gas generating material 15. In this case, the electrical connection between the first terminal 11a and the second terminal 11b is interrupted by rising the internal pressure of the first chamber 13a due to the gas generated from the gas generating material 15, breaking the inner package 13 and inflating the second chamber 14a with the gas discharged from the first chamber 13a.

[3] The battery according to [1], wherein an electrolyte containing the gas generating material 15 is enclosed in the second chamber 14a. In this case, the electrical connection between the first terminal 11a and the second terminal 11b is interrupted by inflating the second chamber 14a with the gas generated from the gas generating material 15.

[4] The battery according to any of [1] to [3], wherein the outer package 14 is configured to expand in a terminal direction, which is a direction in which the second terminal 11b is led out.

[5] The battery according to [4], wherein the outer package 14 is bent in a thickness direction of the first chamber 43a.

[6] The battery according to [2] or [3], wherein the outer package 14 is configured such that the second chamber 14a inflates in a thickness direction of the battery element 10.

[7] The battery according to [6], wherein the first terminal 11a is joined to one inner surface of the opposing outer package 14 and the second terminal 11b is joined to the other inner surface in the second chamber 14a.

[8] The battery according to any of [1] to [7], wherein the first terminal 11a and the second terminal 11b are temporarily fixed in contact with each other.

[9] The battery according to [8], wherein the first terminal 11a and the second terminal 11b are formed with protrusions and recesses respectively, and the first terminal 11a and the second terminal 11b are temporarily fixed by meshing or fitting of the protrusions and recesses.

[10] The battery according to [8] or [9], further comprising a clip 20 which pinches the overlapped portion of the first terminal 11a and the second terminal 11b.

[11] The battery according to [8], wherein further comprising a snap 30 having a male connector 31 and a female connector 32 to be engaged to each other, the male connector 31 is fixed to one of the first terminal 11a and the second terminal 11b and the female connector 32 is fixed to the other.

[12] The battery according to [8], wherein the first terminal 11a and the second terminal 11b are temporarily fixed by coating portions where the first terminal 11a and the second terminal 11b are in contact with each other from the outside with a thermoplastic resin.

[13] The battery according to [12], wherein a melting point of the thermoplastic resin is higher than a temperature of the battery element 10 when the battery 1 is operating normally, and is equal to or lower than a temperature at which the gas generating material 15 acts.

[14] The battery according to any of [1] to [13], wherein the gas generating material 15 comprises a volatile material.

[15] The battery according to [14], wherein the volatile material is a solvent.

[16] The battery according to [15], wherein a volatilization temperature of the solvent is 50° C. or more and less than 200° C.

[17] The battery according to [15] or [16], wherein the solvent is a nonaqueous solvent.

[18] The battery according to [17], wherein the nonaqueous solvent contains an electrolyte component.

[19] A battery pack comprising:
at least one battery 1 according to any of [1] to [18]; and
a holding member 6a, 6b which holds the battery 1 by sandwiching the battery 1 from both sides in the thickness direction.

[20] An electric vehicle comprising the battery 1 according to any of [1] to [18].

[21] A power storage equipment comprising the battery 1 according to any of [1] to [18].

[22] A method for manufacturing a battery, comprising steps of:
enclosing a battery element 10 including a positive electrode and a negative electrode in a first chamber 13a formed by an inner package 13, after connecting a pair of first terminals 11a, 12 to the positive electrode and the negative electrode, with the pair of first terminals 11a, 12 led out from the inner package 13; and
enclosing the inner package 13 in a second chamber 14a formed outside of the inner package 13 by an outer package 13, wherein the step includes arranging a second terminal 11b such that at least one first terminal 11a of the pair of first terminal 11a, 12 is electrically connected in the second chamber 14a and covering at least a part of the inner package 13 with the outer package 14;
wherein the step of enclosing the battery element 10 in the first chamber 13a or the step of enclosing the inner package 13 in the second chamber 14a includes enclosing a gas generating material 15, which generate gas at a predetermined temperature or higher or a predetermined voltage or higher, together.

[23] The method for manufacturing the battery according to [22], wherein the step of covering at least a part of the inner package 13 with the outer package 14 includes joining the first terminal 11a to one surface of the opposing outer package 14 and joining the second terminal 11b to the other surface thereof, in the second chamber 14a.

[24] The method for manufacturing the battery according to [22] or [23], wherein the step of covering at least a part of the inner package 13 with the outer package 14 includes temporarily fixing the second terminal 11b in a state of being electrically connected to the first terminal 11a.

[25] The method for manufacturing the battery according to [24], wherein the temporary fixing includes clipping an overlapped portion of the first terminal 11a and the second terminal 11b with a clip 20.

[26] The method for manufacturing the battery according to [24], wherein the temporary fixing includes using a snap 30 having a male connector 31 and a female connector 32 to be engaged to each other, fixing the male connector 31 to one of the first terminal 11a and the second terminal 11b, and fixing the female connector 32 to the other

[27] The method for manufacturing the battery according to [24], wherein the temporary fixing includes coating a portion where the first terminal 11a and the second terminal 11b are in contact with each other with a thermoplastic resin from the outside.

In addition, a battery 1 according to another aspect of the present invention comprises,
a battery element 10 including a positive electrode and a negative electrode,
an inner package 13 forming a first chamber 13a for enclosing the battery element 10,
an outer package 14 covering at least a part of the inner package 13 so as to form a second chamber 14a surrounding at least a part of the first chamber 13a,
a pair of terminals 11, 12 electrically connected to the positive electrode and the negative electrode and led out to the outside of the outer package 14, and
a current interrupting mechanism which operates to inflate the second chamber 14a by generating a gas at a predetermined temperature or higher or a predetermined voltage or higher and interrupt an electrical connection between the pair of terminals 11, 12 by inflation of the second chamber 14a.

Here, the current interrupt mechanism may include
a first terminal 11a extending into the second chamber 14a,
a second terminal 11b led out to an outside of the outer package 14 in a state where one end side thereof is in contact with the first terminal 11a in the second chamber 14a and fixed to the outer package 14 so as to be separated from the first terminal 11a by inflating the second chamber 14a, and
a gas generating material 15 generating gas at a predetermined temperature or higher or a predetermined voltage or higher.

Industrial Applicability

The battery according to the present invention can be used for all industrial fields requiring power sources and industrial fields related to transportation, storage and supply of electrical energy. More specifically, the battery according to the present invention can be used for power sources for mobile devices such as cellular phone, notebook personal computer; power sources for transfer/transportation media such as trains, satellites and submarines, including electric vehicles such as electric car, hybrid car, electric motorcycle, power assist bicycle; backup power sources for UPS or the like; electric power storage equipment for storing electric power generated by photovoltaic power generation, wind power generation or the like.

REFERENCE SIGNS LIST 1 battery
5 battery pack
6 case
6a, 6b holding member
10 battery element
11, 12 terminal
11a first terminal
11b second terminal
13 inner package
13a first chamber
14 outer package
14a second chamber 15 gas generating material
20 clip
30 snap
31 male connector
32 female connector
111 concave portion
121 convex portion
131 main sheet
132 side sheet
133 mountain portion
200 electric vehicle
210, 310 battery pack
300 power storage device

The invention claimed is:

1. A battery comprising:
   a battery element including a positive electrode and a negative electrode;
   an inner package forming a first chamber for enclosing the battery element; and
   an outer package covering the inner package so as to form a second chamber surrounding the first chamber;
   a pair of terminals electrically connected to the positive electrode and the negative electrode and led out to the outside of the outer package,
   wherein at least one terminal of the pair of terminals has a first terminal and a second terminal arranged so as to be electrically connected in the second chamber, and
   a gas generating material is enclosed in the first chamber or the second chamber, wherein the gas generating material generates gas at a predetermined temperature or higher or a predetermined voltage or higher.

2. The battery according to claim 1, wherein the battery element includes an electrolyte containing the gas generating material.

3. The battery according to claim 1, wherein an electrolyte containing the gas generating material is enclosed in the second chamber.

4. The battery according to claim 1, wherein the outer package is configured to expand in a terminal direction, which is a direction in which the second terminal is led out.

5. The battery according to claim 4, wherein the outer package is bent in a thickness direction of the first chamber.

6. The battery according to claim 2, wherein the outer package is configured such that the second chamber inflates in a thickness direction of the battery element.

7. The battery according to claim 6, wherein the first terminal is joined to one inner surface of the opposing outer package and the second terminal is joined to the other inner surface in the second chamber.

8. The battery according to claim 1, wherein the first terminal and the second terminal are temporarily fixed in contact with each other.

9. The battery according to claim 8, wherein the first terminal and the second terminal are temporarily fixed by coating a portion where the first terminal and the second terminal are in contact with each other from the outside with a thermoplastic resin.

10. The battery according to claim 1, wherein the gas generating material comprises a volatile material.

11. The battery according to claim 10, wherein the volatile material is a solvent.

12. The battery according to claim 11, wherein a volatilization temperature of the solvent is 50° C. or more and less than 200° C.

13. The battery according to claim 11, wherein the solvent is a nonaqueous solvent.

14. The battery according to claim 13, wherein the nonaqueous solvent contains an electrolyte component.

15. A battery pack comprising:
    at least one battery according to claim 1; and
    a holding member which holds the battery by sandwiching the battery from both sides in the thickness direction.

16. A method for manufacturing a battery, comprising steps of:
    enclosing a battery element including a positive electrode and a negative electrode in a first chamber formed by an inner package, after connecting a pair of first terminals to the positive electrode and the negative electrode, with the pair of first terminals led out from the inner package; and
    enclosing the inner package in a second chamber formed outside of the inner package by an outer package, wherein the step includes arranging a second terminal such that at least one first terminal of the pair of first terminals is electrically connected in the second chamber and covering the inner package with the outer package;
    wherein the step of enclosing the battery element in the first chamber or the step of enclosing the inner package in the second chamber includes enclosing a gas generating material, which generate gas at a predetermined temperature or higher or a predetermined voltage or higher, together.

17. The method for manufacturing the battery according to claim 16, wherein the step of covering the inner package with the outer package includes joining the first terminal to one surface of the opposing outer package and joining the second terminal to the other surface thereof, in the second chamber.

18. The method for manufacturing the battery according to claim 16, wherein the step of covering the inner package with the outer package includes temporarily fixing the second terminal in a state of being electrically connected to the first terminal.

* * * * *